(12) United States Patent
Raffle et al.

(10) Patent No.: US 9,547,365 B2
(45) Date of Patent: Jan. 17, 2017

(54) MANAGING INFORMATION DISPLAY

(71) Applicant: Google Inc., Mountain View, CA (US)

(72) Inventors: Hayes Solos Raffle, Palo Alto, CA (US); Michael Patrick Johnson, Sunnyvale, CA (US); Alok Chandel, Sunnyvale, CA (US); Chun Yat Frank Li, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/486,360

(22) Filed: Sep. 15, 2014

(65) Prior Publication Data

US 2016/0077337 A1 Mar. 17, 2016

(51) Int. Cl.
*G06F 3/01* (2006.01)
*G06F 3/0482* (2013.01)
*G02B 27/01* (2006.01)

(52) U.S. Cl.
CPC ............. *G06F 3/013* (2013.01); *G02B 27/017* (2013.01); *G06F 3/0482* (2013.01); *G02B 2027/014* (2013.01); *G02B 2027/0178* (2013.01); *G02B 2027/0187* (2013.01)

(58) Field of Classification Search
CPC ........ G06F 1/1673; G06F 3/013; G06Q 30/02; G06Q 30/0261
See application file for complete search history.

(56) References Cited

U.S. PATENT DOCUMENTS

| 7,743,340 | B2 | 6/2010 | Horvitz et al. |
| 2008/0002262 | A1 | 1/2008 | Chirieleison |
| 2011/0170067 | A1* | 7/2011 | Sato ............... G06K 9/00604 351/209 |
| 2012/0206334 | A1* | 8/2012 | Osterhout ........... G06F 1/163 345/156 |
| 2013/0114850 | A1 | 5/2013 | Publicover et al. |
| 2013/0141313 | A1 | 6/2013 | Zhou et al. |
| 2013/0244633 | A1 | 9/2013 | Jacobs et al. |

(Continued)

FOREIGN PATENT DOCUMENTS

JP     2011200533 A     10/2011

OTHER PUBLICATIONS

Tofel, Google Glass gets more hands-free with notifications when you glance, Tech News and Analysis, http://gigaom.com/2014/06/05/google-glass-gets-more-hands-free-with-notifications-when-you-glance/, Jun. 5, 2014—5:30 AM PDT.

(Continued)

*Primary Examiner* — Shaheda Abdin
(74) *Attorney, Agent, or Firm* — McDonnell Boehnen Hulbert & Berghoff LLP

(57) ABSTRACT

An example method includes receiving, by a head-mountable device (HMD), data corresponding to an information event, and providing an indication corresponding to the information event in response to receiving the data. The method further includes determining a gaze direction of an eye and determining that the gaze direction of the eye is an upward direction that corresponds to a location of a display of the HMD. The display is located in an upper periphery of a forward-looking field of view of the eye when the HMD is worn. The method further includes, in response to determining that the gaze direction of the eye is the upward direction, displaying graphical content related to the information event in the display.

22 Claims, 17 Drawing Sheets

(56) References Cited

U.S. PATENT DOCUMENTS

2013/0257709 A1* 10/2013 Raffle .................... G06F 3/017
 345/156
2014/0101608 A1  4/2014 Ryskamp et al.
2014/0191946 A1  7/2014 Cho et al.

OTHER PUBLICATIONS

International Search Report mailed on Aug. 28, 2015 issued in connection with International Application No. PCT/US2015/034353, filed on Jun. 5, 2015, 3 pages.
Written Opinion of the International Searching Authority mailed on Aug. 28, 2015 issued in connection with International Application No. PCT/US2015/034353, filed on Jun. 5, 2015, 9 pages.

\* cited by examiner

MANAGING INFORMATION DISPLAY

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Within examples, a head-mountable device (HMD) may be configured to receive data indicating the occurrence of information events, and provide a simple and unobtrusive input mechanism to notify and allow a user to view content corresponding to such events. Examples of such information events may include the HMD receiving an email message, receiving a text (e.g., SMS or MMS) message, or generating a system message (e.g., indicating low battery or indicating that updates for applications installed on the HMD are available for download). Upon receiving data indicating an information event, the HMD may notify the wearer in an unobtrusive manner by, e.g., playing a certain audio alert (e.g., a beep) or displaying a small summary of the corresponding content, such as the subject line of a received email or the headline of a news story.

The HMD may then "load" the corresponding content, and provide a simple mechanism for the wearer to choose to ignore the indication or access the corresponding content, according to their preference. In particular, if the wearer wishes to view the content corresponding to the event while the content is loaded, the user may simply glance up at the HMD's display. The HMD can then determine the wearer has looked upward towards the display, and responsively display more detailed information corresponding to the event (e.g., a full email or text message, a full news story, etc.). However, if the wearer does not want to view the corresponding information, the wearer may simply ignore the indication. The HMD may determine when a threshold duration elapses after providing the indication, and responsively cease display and/or playout of the indication. Further, when the threshold duration elapses, the HMD may "unload" the content corresponding to event, such that an upward glance will no longer cause the corresponding content to be displayed.

In a first example, a method includes receiving, by a head-mountable device (HMD), data corresponding to an information event, where a display of the HMD is located in an upper periphery of a forward-looking field of view of an eye of a wearer when the HMD is worn by the wearer. The method further includes providing an indication corresponding to the information event in response to receiving the data, determining a gaze direction of the eye, and determining that the gaze direction is an upward direction that corresponds to the location of the display. The method further includes, in response to determining that the gaze direction of the eye is the upward direction corresponding to the location of the display, displaying graphical content related to the information event in the display.

In a second example, an HMD includes a processor, an eye-detection system, and a display arranged on the HMD such that when the HMD is worn by a wearer, the display is located in an upper periphery of a forward-looking field of view of the wearer. The HMD further includes a computer-readable medium storing instructions that when executed by the processor cause the HMD to perform functions. The functions include receiving data corresponding to an information event and providing an indication corresponding to the information event in response to receiving the data. The functions further include determining a gaze direction of an eye and determining that the gaze direction of the eye is an upward direction that corresponds to a location of the display. The functions further include, in response to determining that the gaze direction of the eye is the upward direction, displaying graphical content related to the information event in the display.

A third example includes a non-transitory computer-readable medium storing instructions that when executed by an HMD causes the HMD to perform functions. The HMD includes a display located in an upper periphery of a forward-looking field of view of an eye of a wearer when the HMD is worn by the wearer. The functions comprise receiving data corresponding to an information event and providing an indication corresponding to the information event in response to receiving the data. The functions further include determining a gaze direction of an eye and determining that the gaze direction of the eye is an upward direction that corresponds to a location of the display. The functions further include, in response to determining that the gaze direction of the eye is the upward direction, displaying graphical content related to the information event in the display.

In a fourth example, an example system is provided. The system includes a display that is located in an upper periphery of a forward-looking field of view of an eye of a wearer when the system is worn by the wearer. The system further includes means for receiving data corresponding to an information event and means for providing an indication corresponding to the information event in response to receiving the data. The system further includes means for determining a gaze direction of the eye and means for determining that the gaze direction of the eye is an upward direction that corresponds to the location of the display. The system further includes means for, in response to determining that the gaze direction of the eye is the upward direction, displaying graphical content related to the information event in the display.

In a fifth example, an example method includes receiving, by a head-mountable device (HMD), data corresponding to an information event. A display of the HMD is located in an upper periphery of a forward-looking field of view of an eye of a wearer when the HMD is worn by the wearer. The method further includes providing an indication corresponding to the information event in response to receiving the data. The method further includes determining a first gaze direction of an eye, where the first gaze direction is aligned with the display. The method further includes determining a second gaze direction of the eye, where the second gaze direction is not aligned with the display. The method further includes determining that a duration between determining the first gaze direction and determining the second gaze direction is less than a threshold duration. The method further includes, in response to determining that the duration is less than the threshold duration, causing the indication to no longer be provided.

In a sixth example, an HMD includes a processor, an eye-detection system, and a display arranged on the HMD such that when the HMD is worn by a wearer, the display is located in an upper periphery of a forward-looking field of view of the wearer. The HMD further includes a computer-readable medium storing instructions that when executed by the processor cause the HMD to perform functions. The functions comprise receiving data corresponding to an information event and providing an indication corresponding to the information event in response to receiving the data. The functions further comprise determining a first gaze direction of an eye, where the first gaze direction is aligned with the display. The functions further include determining a second gaze direction of the eye, where the second gaze direction is not aligned with the display. The functions further comprise determining that a duration between determining the first gaze direction and determining the second gaze direction is less than a threshold duration. The functions further include, in response to determining that the duration is less than the threshold duration, causing the indication to no longer be provided.

A seventh example includes a non-transitory computer-readable medium storing instructions that when executed by an HMD causes the HMD to perform functions. A display of the HMD is located in an upper periphery of a forward-looking field of view of an eye of a wearer when the HMD is worn by the wearer. The functions comprise receiving data corresponding to an information event and providing an indication corresponding to the information event in response to receiving the data. The functions further comprise determining a first gaze direction of an eye, where the first gaze direction is aligned with the display. The functions further include determining a second gaze direction of the eye, where the second gaze direction is not aligned with the display. The functions further include determining that a duration between determining the first gaze direction and determining the second gaze direction is less than a threshold duration. The functions further include, in response to determining that the duration is less than the threshold duration, causing the indication to no longer be provided.

In an eighth example, an example system includes a display that is located in an upper periphery of a forward-looking field of view of an eye of a wearer when the system is worn by the wearer. The system further includes means for receiving data corresponding to an information event and means for providing an indication corresponding to the information event in response to receiving the data. The system further includes means for determining a first gaze direction of an eye, where the first gaze direction is aligned with the display. The system further includes means for determining a second gaze direction of the eye, where the second gaze direction is not aligned with the display. The system further includes means for determining that a duration between determining the first gaze direction and determining the second gaze direction is less than a threshold duration. The system further includes means for, in response to the determining that the duration is less than the threshold duration, causing the indication to no longer be provided.

In a ninth example, an example method includes receiving, by a head-mountable device (HMD), data corresponding to an information event, where a display of the HMD is located in an upper periphery of a forward-looking field of view of an eye of a wearer when the HMD is worn by the wearer; providing, by the HMD, an indication corresponding to the information event in response to receiving the data; illuminating, by an eye-detection system of the HMD, an eye area corresponding to the eye with one or more incident light beams; detecting, by the eye-detection system, an intensity of one or more reflected light beams corresponding to the one or more incident light beams; receiving, by the HMD, a signal from the eye-detection system of the HMD, where the signal represents the intensity; determining, by the HMD, that the received signal corresponds to predetermined signal criteria, where the predetermined signal criteria corresponds to a gaze direction of the eye that is an upward direction that corresponds to the location of the display; and in response to the determination, displaying, by the HMD, graphical content related to the information event in the display.

In a tenth example, an HMD includes a processor, an eye-detection system, and a display arranged on the HMD such that when the HMD is worn by a wearer, the display is located in an upper periphery of a forward-looking field of view of the wearer. The HMD further includes a computer-readable medium storing instructions that when executed by the processor cause the HMD to perform functions. The functions comprise receiving data corresponding to an information event; providing an indication corresponding to the information event in response to receiving the data; illuminating, by an eye-detection system of the HMD, an eye area corresponding to the eye with one or more incident light beams; detecting, by the eye-detection system, one or more reflected light beams respectively corresponding to the one or more incident light beams; receiving a signal from the eye-detection system of the HMD, where the signal represents an intensity of the one or more reflected light beams; determining that the received signal corresponds to predetermined signal criteria, where the predetermined signal criteria corresponds to a gaze direction of the eye that is an upward direction that corresponds to the location of the display; and in response to the determination, displaying graphical content related to the information event in the display.

An eleventh example includes a non-transitory computer-readable medium storing instructions that when executed by an HMD causes the HMD to perform functions. A display of the HMD is located in an upper periphery of a forward-looking field of view of an eye of a wearer when the HMD is worn by the wearer. The functions comprise receiving data corresponding to an information event; providing an indication corresponding to the information event in response to receiving the data; illuminating, by an eye-detection system of the HMD, an eye area corresponding to the eye with one or more incident light beams; detecting, by the eye-detection system, one or more reflected light beams respectively corresponding to the one or more incident light beams; receiving a signal from the eye-detection system of the HMD, where the signal represents an intensity of the one or more reflected light beams; determining that the received signal corresponds to predetermined signal criteria, where the predetermined signal criteria corresponds to a gaze direction of the eye that is an upward direction that corresponds to the location of the display; and in response to the determination, displaying graphical content related to the information event in the display.

In a twelfth example, an example system includes a display that is located in an upper periphery of a forward-looking field of view of an eye of a wearer when the system is worn by the wearer. The system further includes means for receiving data corresponding to an information event; means for providing an indication corresponding to the information event in response to receiving the data; means for illuminating an eye area corresponding to the eye with one or more incident light beams; means for detecting one or more reflected light beams respectively corresponding to the one or more incident light beams; means for receiving a signal from the eye-detection system of the HMD, where the signal represents an intensity of the one or more reflected light beams; means for determining that the received signal corresponds to predetermined signal criteria, where the predetermined signal criteria corresponds to a gaze direction of the eye that is an upward direction that corresponds to the location of the display; and means for, in response to the determination, displaying graphical content related to the information event in the display.

These as well as other aspects, advantages, and alternatives will become apparent to those of ordinary skill in the art by reading the following detailed description, with reference where appropriate to the accompanying drawings.

DETAILED DESCRIPTION

Figure 1A:
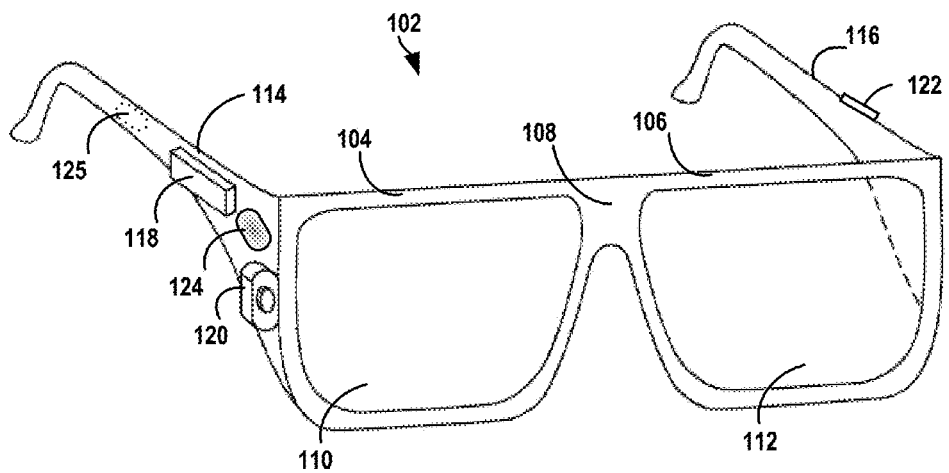
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

A head-mountable device (HMD) may perform various functions, some of which may include providing visual or audio information about surroundings, receiving email or text messages, or providing indications related to such messages or information via the HMD. For instance, a camera of the HMD may capture an image of a location of interest (e.g., a bus stop, a restaurant, or a museum) within the surroundings of the HMD. The HMD may recognize the location of interest and provide an audio indication (e.g., a chime) indicating that information regarding the location of interest is available to be provided via the HMD.

In another example, the HMD may receive an email message and provide a visual indication related to the received email message in a heads-up display of the HMD. The visual indication may include displayed text representing a portion of the message, the sender of the message, or any other visual indication that the message has been received by the HMD and is available to be provided by the HMD.

After noticing an audio or visual indication provided by the HMD, a user of the HMD may desire to view or hear additional details regarding the incoming message or to be provided information related to the location of interest. Some methods for causing the HMD to provide the additional details regarding the incoming message or information related to the location of interest may include the HMD detecting (i) a head movement or a head gesture by the user that is recognizable to the HMD (via sensors) as a command to provide the additional details, (ii) receiving a voice command, or (iii) receiving a touch input at a touch sensor of the HMD. However, these methods may be considered inefficient, inconvenient, or too conspicuous.

Instead, the HMD may provide the indication and then detect an upward movement of the user's eye toward the heads-up display of the HMD, indicating that the user desires to be provided the additional details represented by the audio or visual indication. This may require less effort or be more convenient and/or inconspicuous than a head gesture, a voice command, or a touch input. In some examples, the HMD may provide the additional details based on detecting the upward eye movement within a predefined window of time after the indication is provided by the HMD. For example, the HMD may provide the indication, and if the upward movement of the eye is detected within five seconds of providing the indication, the HMD may provide the additional details represented by the indication. However, if the HMD does not detect the upward eye movement within 5 seconds, the HMD may not display the additional details. Further, if the indication is a visual indication, the HMD may cause the visual indication to disappear after the time window elapses. Having the HMD conditionally provide the additional details based on detecting the upward eye movement within the time window may reduce the likelihood of "false positives," or providing additional details when the user does not wish to receive the additional details.

Having the HMD provide additional details related to information events in response to the wearer looking up at the display of the HMD may be beneficial to the wearer in a variety of ways. In the case of additional details that are visual, the wearer will likely look up at the display to view the additional details regardless of what type of wearer input the HMD receives to cause the additional details to be displayed by the HMD. Therefore, causing the additional details to be displayed in response to the upward glance may reduce the amount of effort expended by the wearer in viewing the additional details. Also, providing the additional details based on the upward glance does not require the wearer to use hands in any way, perhaps allowing the wearer to continue any activity the wearer was in the midst of performing. Also, if the wearer wishes to ignore the indication and avoid being provided the additional details, the wearer must simply avoid looking up at the display of the HMD, which in this case the wearer would prefer to do anyways.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer-readable medium, which has program instructions stored thereon that are executable by at a processor to provide the functionality described herein. An example system may also take the form of a device such as a wearable computer or mobile phone, or a subsystem of such a device, which includes such a non-transitory computer-readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may include portions positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture devices may be used, and each may be configured to capture the same view, or to capture different views. For example, the image capture device 120 may be forward-facing to capture at least a portion of the real-world view perceived by the user. This forward-facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors such as one or more gyroscopes, one or more accelerometers, one or more magnetometers, one or more image sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
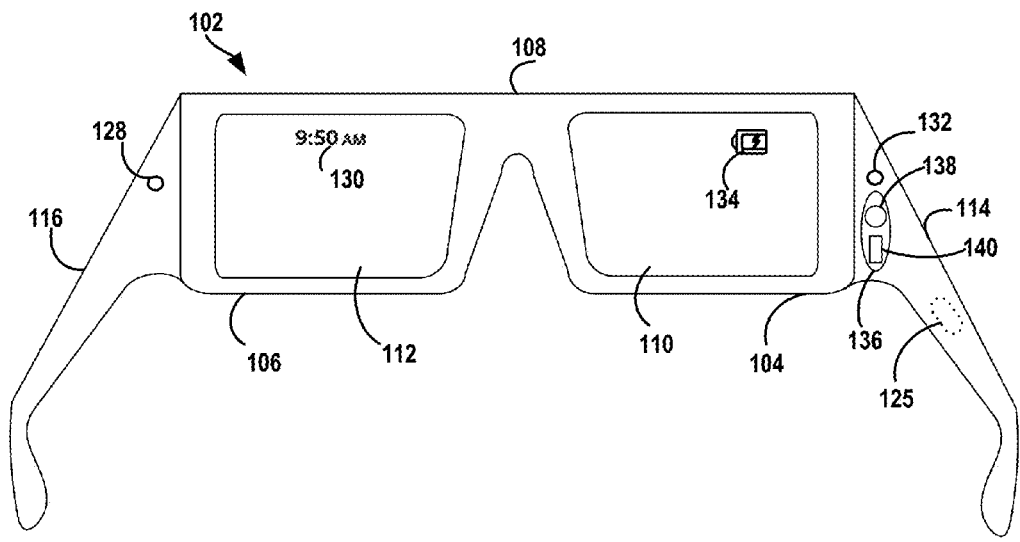
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in-focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

A gaze detection system 136 (e.g., a proximity sensor) is shown in FIG. 1B to include a light source 138 and a light sensor 140 affixed to the extending side-arm 114 of the HMD 102. (The gaze detection system 136 may also be referred to as an "eye detection system" or a "viewing direction detecting system.") The gaze detection system 136 can include one or more light sources and elements other than those shown in FIG. 1B. Additionally, the gaze detection system 136 can be affixed to the HMD 102 in a variety of other ways. For example, the light source 138 can be mounted separately from the light sensor 140. As another example, the gaze detection system 136 can be mounted to other frame elements of the HMD 102, such as the lens-frames 104 or 106, center frame support 108, and/or extending side-arm 116.

Figure 1C:
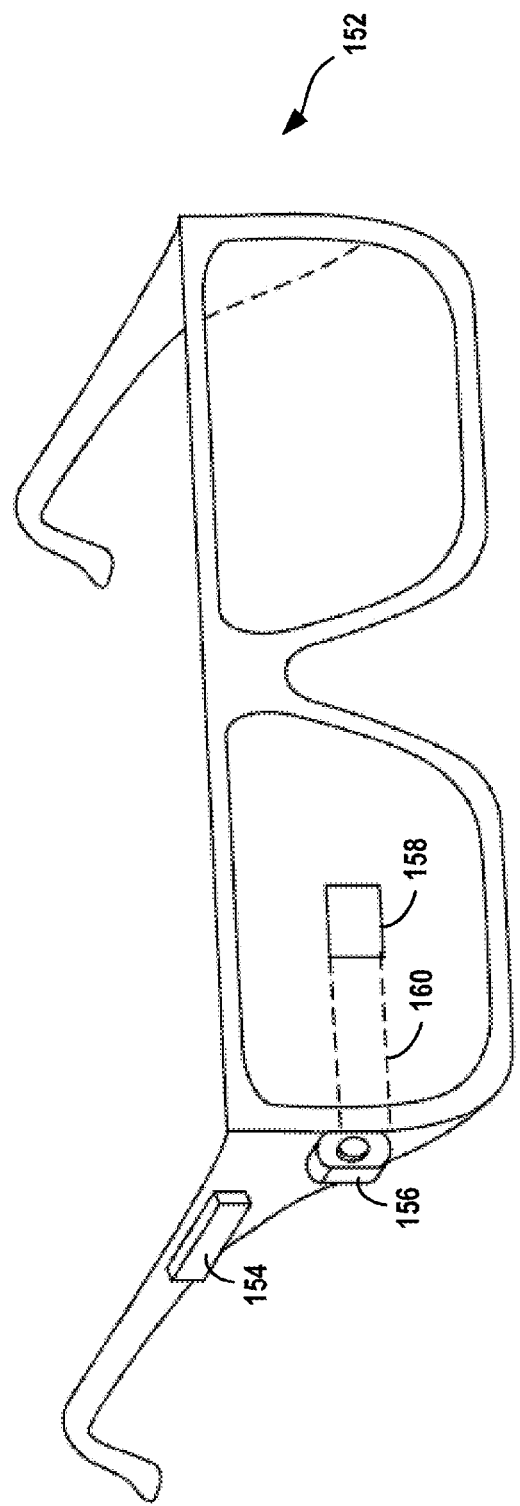
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
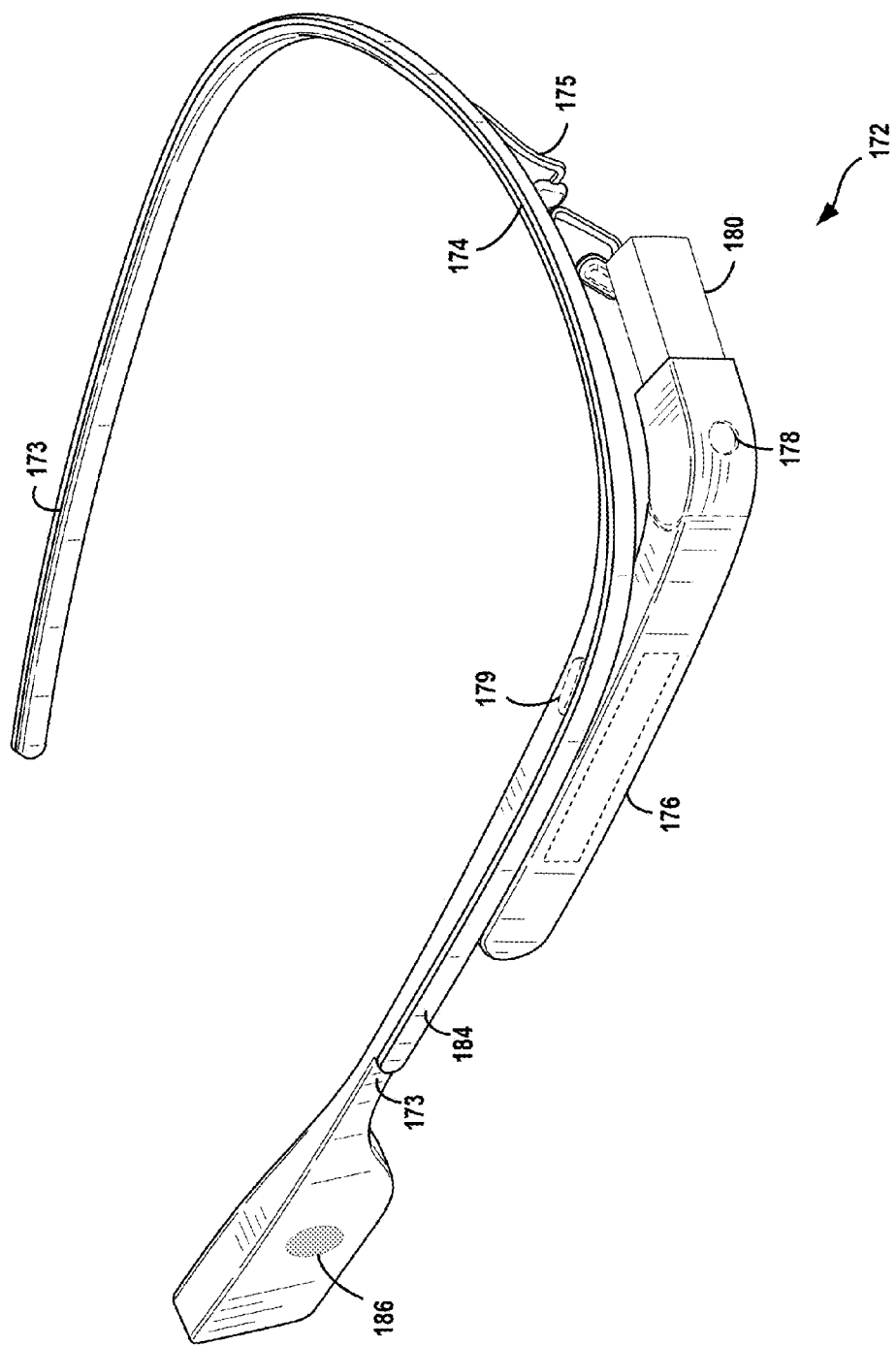
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
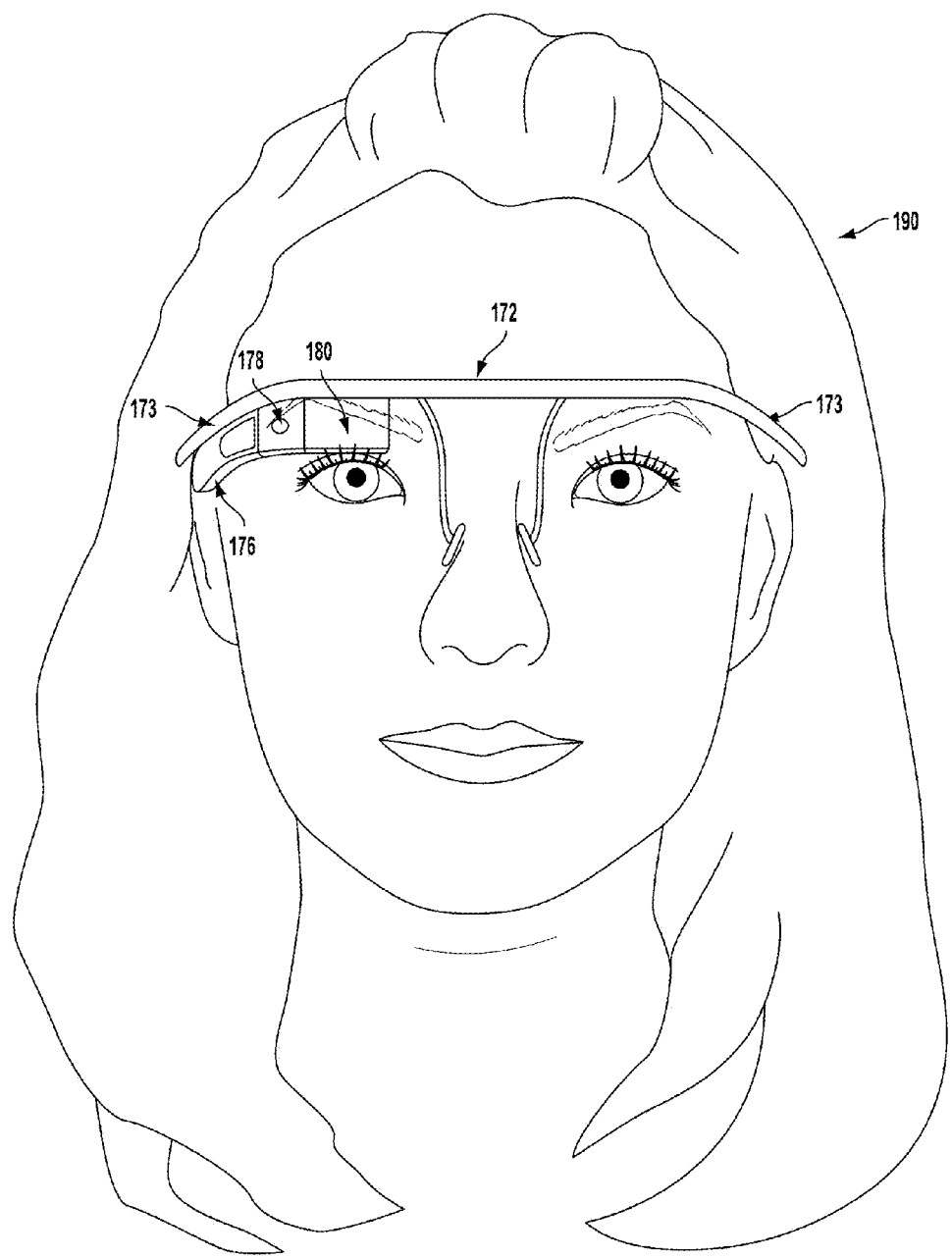
FIGS. 1E, 1F, and 1G are simplified illustrations of the wearable computing system shown in FIG. 1D, being worn by a wearer.
Figure 1F:
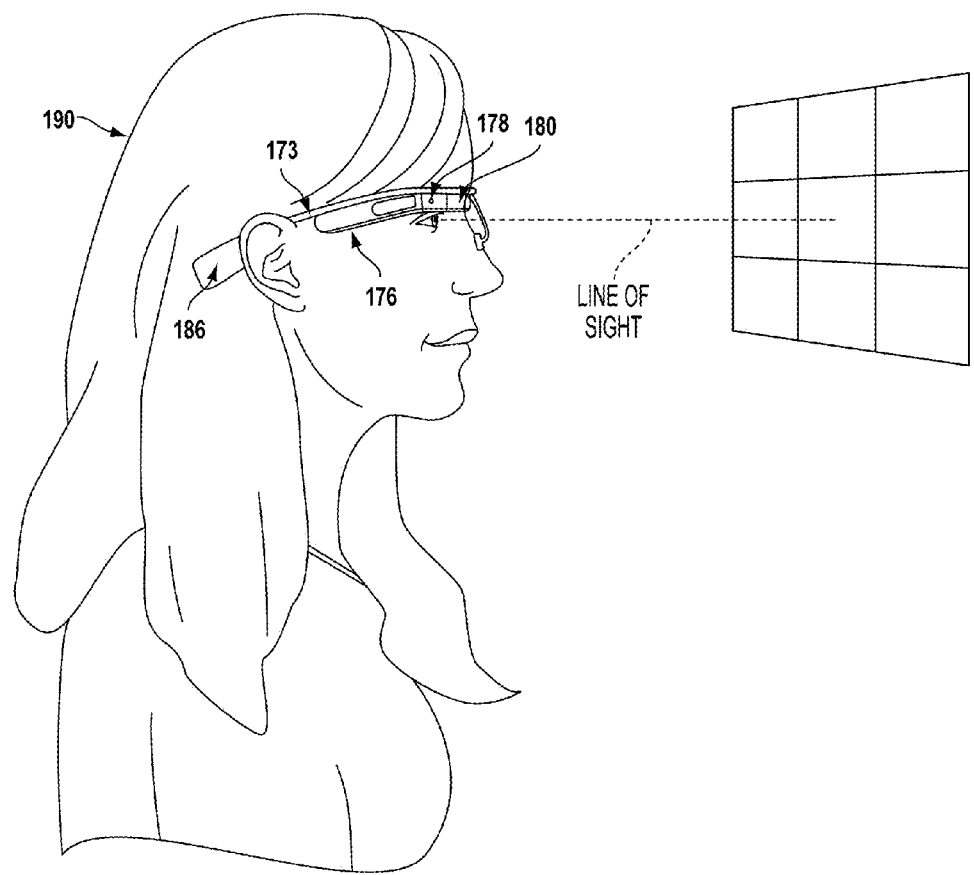
Figure 1G:
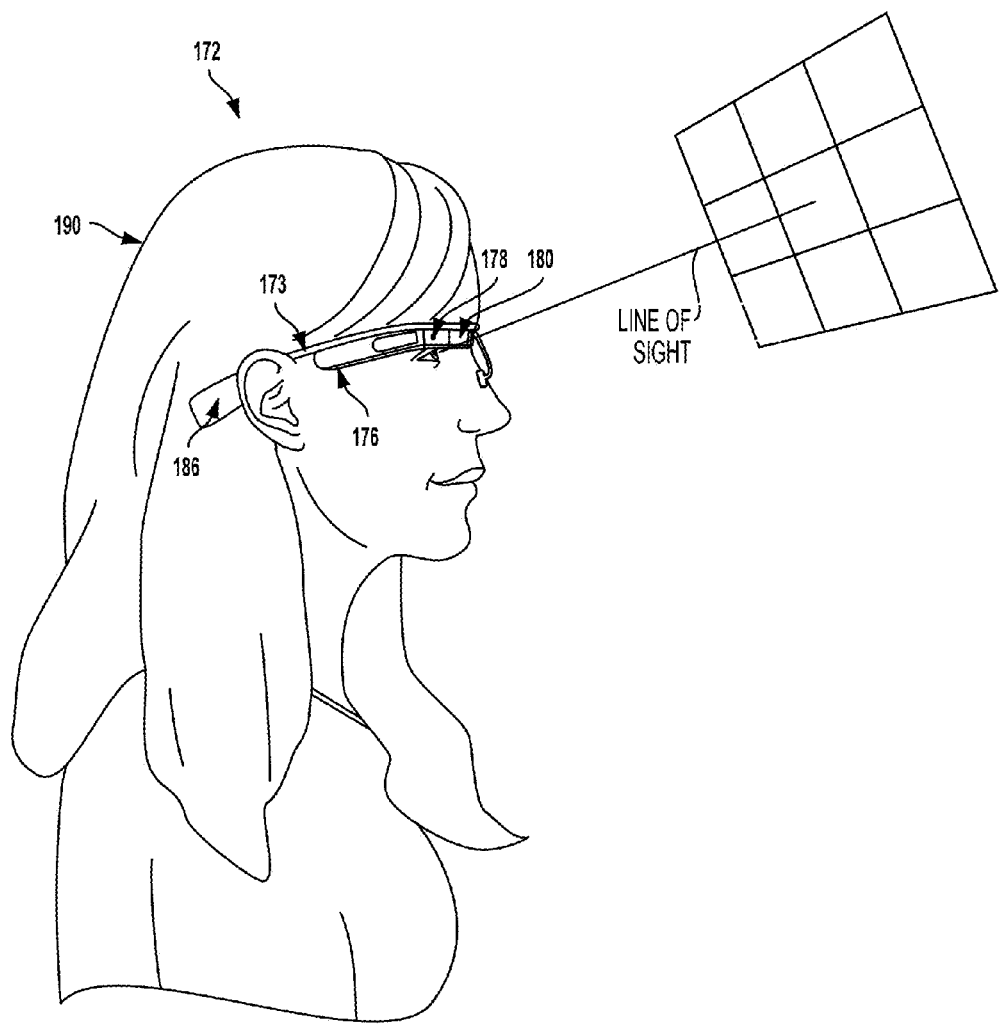

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
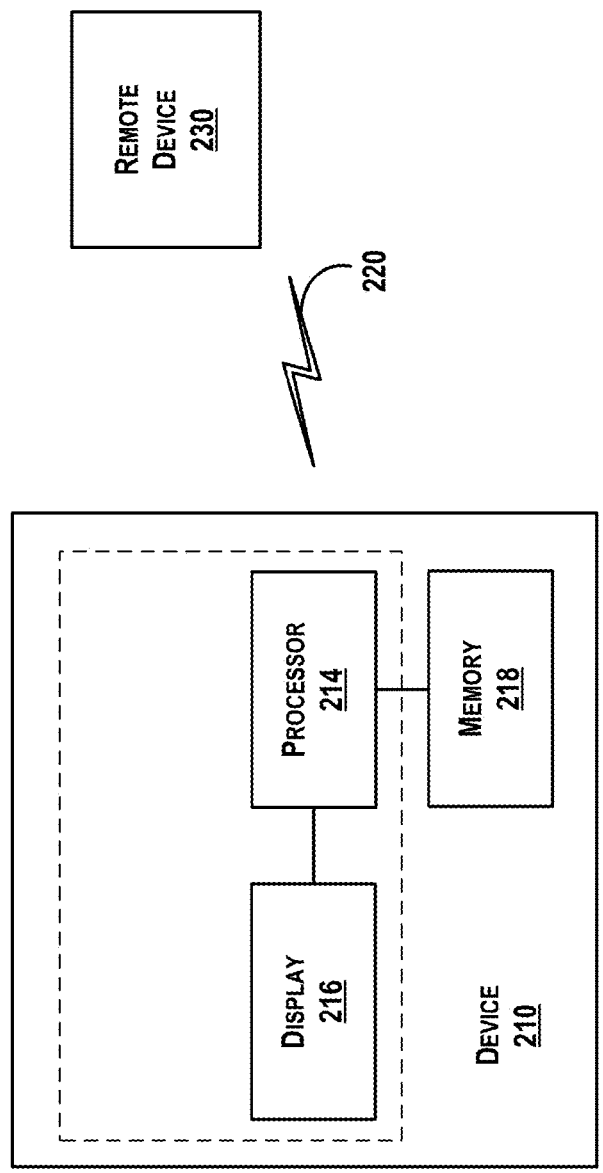
FIG. 2 is a simplified block diagram of a computing device according to an example embodiment.

FIG. 2 is a simplified block diagram of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of a client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. DETERMINING A GAZE DIRECTION OF AN EYE USING A PROXIMITY SENSOR a. Illuminating an Eye Area with Light A gaze detection system 136 (e.g., a proximity sensor) can include one or more light sources, such as light source 138 of FIG. 1B, or light sources 854A and 854B of FIGS. 8A-C. The one or more light sources can be controlled by the HMD 102. When in use, the light sources can illuminate portions of an eye area, which may include the wearer's eye surface, eyelids, and portions of the face around the eye. The light sources can respectively illuminate some or all of the eye area.

As used in this disclosure, the term "light source" can include any device or set of devices configured to provide electromagnetic (EM) radiation suitable for performing non-invasive reflectivity measurements near the eye area of the wearer. The EM radiation can be visible light, or the EM radiation can be a suitable type of EM radiation that is outside the range of frequencies normally visible to humans. For example, some implementations can use one or more infrared light sources. Thus, as used in this disclosure, the term "light" can include both EM radiation that is in the visible range of frequencies and EM radiation that is outside the visible range of frequencies, depending on the desired implementation and the context in which the term "light" is used.

Figure 8A:
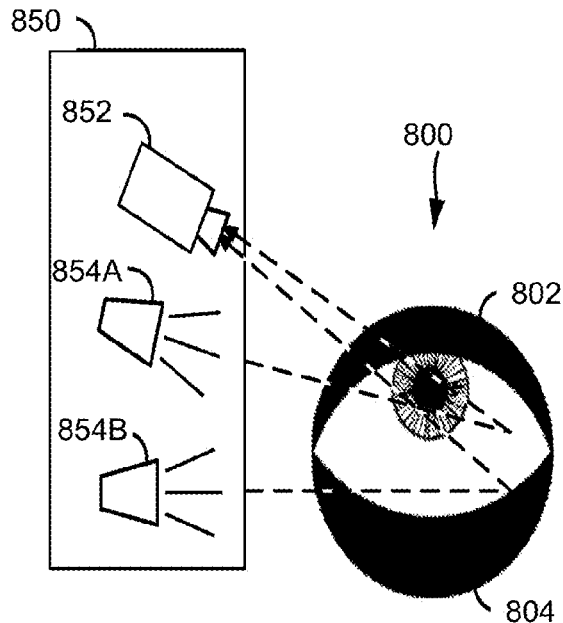
FIG. 8A illustrates a gaze detection system detecting an upward gaze direction of an eye.
Figure 8B:
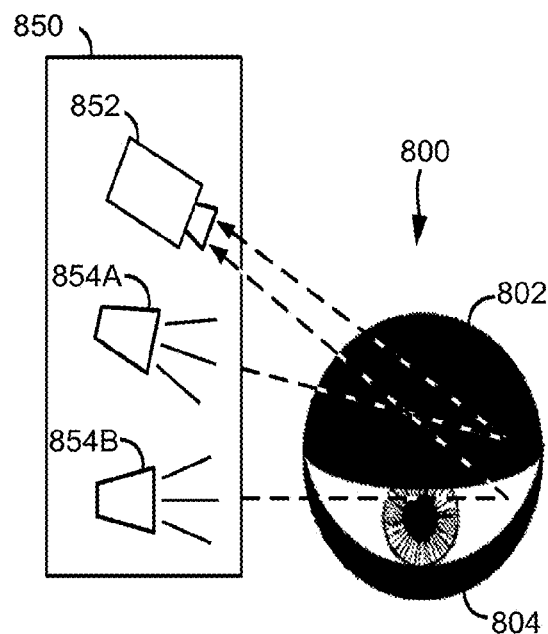
FIG. 8B illustrates a gaze detection system detecting a downward gaze direction of an eye.
Figure 8C:
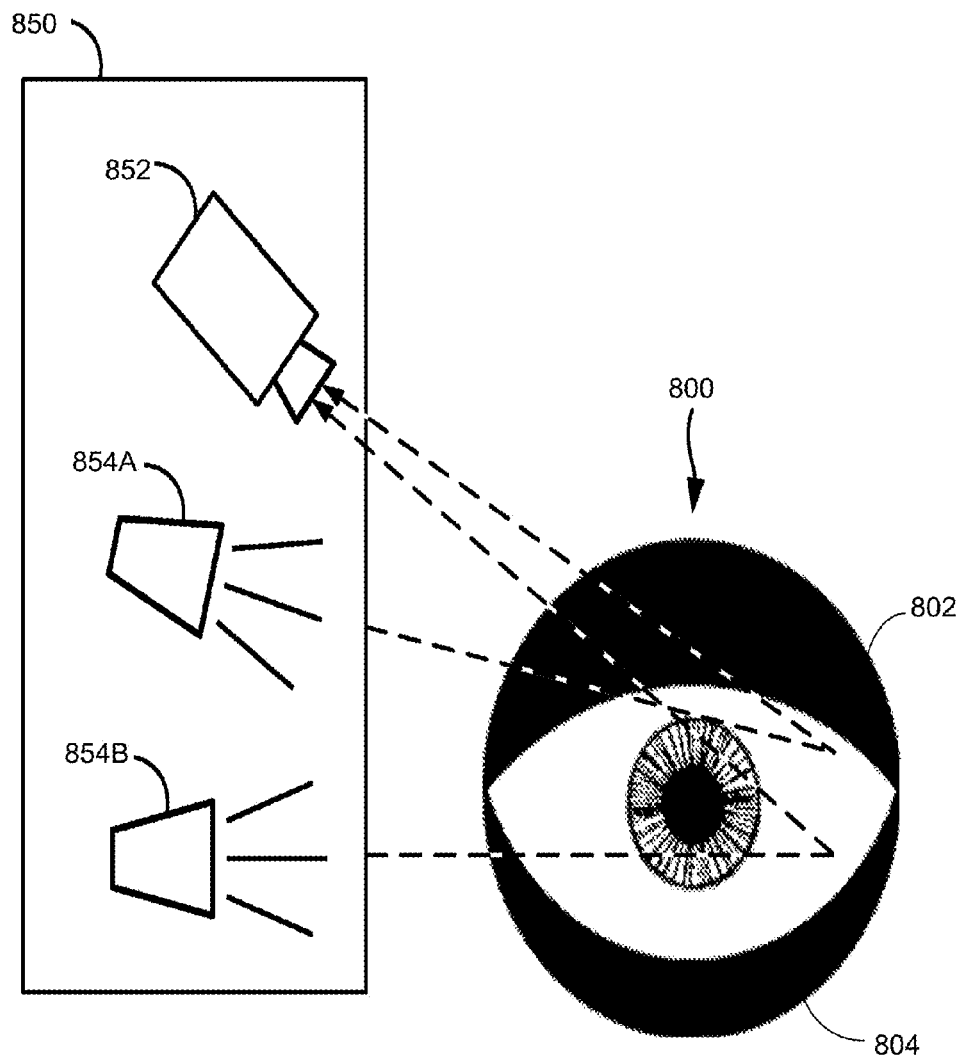
FIG. 8C illustrates a gaze detection system detecting a forward gaze direction of an eye.

In one example, the HMD provides light to the eye area from one or more light sources, such as light source 138 of FIG. 1B or light sources 854A and 854B of FIGS. 8A-C. The light sources may continuously provide light to portions of the eye area, or they can provide light to the eye area intermittently. For example, the light sources can cycle between being illuminated and not illuminated to facilitate the gaze detection system distinguishing between light reflecting from the eye area corresponding to respective light sources. Further, such cycling of the light sources can help the gaze detection system to differentiate between ambient light and reflected light signals corresponding to the respective light sources. In some embodiments, a gaze detection system can include both always-on and intermittent light sources.

Because facial structures generally differ from wearer to wearer, some gaze detection systems can calibrate the direction, position, and spot size/shape characteristics of the light sources based on detected facial characteristics. For example, a system can determine the direction from the respective light sources to the center of an eye area (using, for example, gaze tracking, glint detection, video recognition, or combinations thereof) and then change the arrangement of light sources to aim at the area around the center of the eye area.

b. Detecting Light Reflected from the Eye Area

A light sensor, such as light sensor 140 of FIG. 1B or light sensor 852 of FIGS. 8A-C, may be arranged to sense or detect light reflected from an eye area of the wearer. For example, with reference to FIGS. 1A and 1B, when the HMD 102 is worn, the light sensor 140 may face an eye area of the wearer and may detect movement of the eye area represented by changes in reflected light intensity (e.g., light provided by the light source 138 that reflects off the eye area).

The light sensor 140 can be configured to detect certain aspects of the reflected light, such as frequency and intensity of the reflected light. Other aspects can also be detected, such as polarization, coherence, phase, spectral width, and/or modulation.

The light sensor 140 can also be arranged to detect light reflected from a particular portion of the eye area or to detect light from the entire eye area. Additionally, the light sensor 140 can be designed to detect light with certain attributes, such as, for example, a certain frequency of modulation, a frequency of light, or light with a particular polarization.

The intensity of reflected light detected by the light sensor 140 can change based on characteristics of various locations of the eye area. In particular, for a given intensity of light provided by the light source 138, the light sensor 140 may detect more reflected light intensity when the light sensor 140 is aligned to detect light reflected from the skin surrounding the eye (including the eyelids) than when the light sensor 140 is aligned to detect light reflected from the surface of the eye (e.g., the sclera, cornea, or the like). For example, various skin and eye surfaces may have differing light scattering and/or reflecting characteristics. Therefore, the light sensor detecting an increase in light intensity may be indicative of an eye movement that increases the amount of skin occupying the detectable area of the light sensor. For example, a light sensor that detects light from the surface of an eye when the eye is open (relatively less light) can also detect light from the eyelid when the eye is closed (relatively more light).

In addition to an eye closing, other eye movements can be indicated by an increase in the light intensity detected by a light sensor. In FIG. 8A, the eye is looking in an upward direction, as compared to FIG. 8C in which the eye is looking forward, and FIG. 8B, in which the eye is looking in a downward direction. Accordingly, as the eye transitions from a forward gaze direction depicted in FIG. 8C to an upward gaze direction depicted in FIG. 8A, the bottom eyelid 804 may move up into a path of the light emitted by the light source 854B. The intensity of the light detected by light sensor 852 and provided from the light source 854B, therefore, may increase as a result of the upward eye movement, because more skin may be illuminated by the light source 854B than in the situations depicted in FIG. 8C (where the eye is looking forward) or FIG. 8B (where the eye is looking downward). Meanwhile, as shown in FIG. 8A, the light from the light source 854A may illuminate the eye surface (as similarly depicted in FIG. 8C), without illuminating the eyelid 802. Hence, the intensity of light provided by the source 854B may remain unchanged, yet the total light intensity detected by light sensor 852 from both light sources 854A and 854B may increase as a result of the upward eye movement, as shown in the transition from FIG. 8C to FIG. 8A.

As another example, FIG. 8B shows the gaze detection system 850 to be interacting with an eye area 800, in a situation in which the eye is looking down. As shown in FIG. 8B, the wearer's top eyelid 802 has moved down into the path of the light emitted by the light source 854A. The intensity of the light detected by the sensor 852 and provided by the light source 854A, therefore, may increase as a result of the gaze direction changing from forward (as in FIG. 8C) to downward (as in FIG. 8B), because more skin may be illuminated than in the situation depicted in FIG. 8C. Meanwhile, the light from the source 854B still does not illuminate the top eyelid 802. Hence, the total intensity of light detected from the source 854B would remain unchanged, and the overall detected light intensity from both sources can increase as a result of the gaze direction change from forward to downward.

c. Determining a Gaze Direction

The gaze detection system 850 and/or the HMD 102 may determine a gaze direction representing the direction along which the eye is oriented (e.g., an axis along which the pupil of the eye is centered). For example, the total light detected by the gaze detection system 850 can increase as a result of an eye moving from a forward gaze direction (FIG. 8C) to an upward gaze direction (FIG. 8A) or a downward gaze direction (FIG. 8B). Hence, if the gaze detection system 850 is configured to differentiate between reflected light intensities respectively corresponding to light sources 854A and 854B, the increases (or decreases) in reflected light intensity detected from each respective light source 854A and 854B can be associated with corresponding eye movements (e.g., downward and upward).

To facilitate associating light-intensity data with eye-movement information, the system can collect and store representative light-intensity data corresponding to known eye movements. For example, the gaze detection system 850 or the HMD 102 may store data representing light-intensity levels that correspond with a particular gaze direction. Alternatively, user-specific data can be gathered. For instance, a wearer can be instructed to follow a calibration procedure to store particular intensity data associated with the particular wearer's facial characteristics. In particular, the HMD 102 can prompt the wearer to look in different directions such as, for example, by audio or text commands, or by displaying an indicator in the direction that the wearer should be looking, and then the gaze detection system 850 and/or HMD 102 can store data representing the intensity of light that is detected from the wearer's eye area while the wearer is looking in the different directions. This calibration process may be repeated for a new wearer of the HMD 102.

IV. DETERMINING A GAZE DIRECTION OF AN EYE USING REFLECTED GLINTS

In accordance with example embodiments, eye position sensing may be used in real time by a wearable computing device, such as a HMD, to provide input to one or more applications or programs on the HMD. For example, an application may use eye gaze direction and/or eye motion to control a visual cursor on a display. Eye position sensing may also provide input to one or more applications or programs running on a computing device, such as a server, that is communicatively connected with the HMD but external to it. Note, that throughout this disclosure "viewing direction" or "eye position" may be used equivalently with "gaze direction."

a. Eye Position Sensing

Eye position sensing may include one or more detection and/or measurement operations to obtain eye position data that contains information indicative of eye movement and other observable features and characteristics of one or more eyes. Eye position sensing may also include one or more analysis operations to analyze the data to determine the eye position, eye movement, and the other observable features and characteristics of one or more eyes in a form suitable for input by an application or for interpretation by a user, for example.

Sensing and/or measurement may be carried out by an eye-sensing device, such as a video camera, configured to observe and/or measure position, movement, and possibly other characteristics of the one or more eyes. Analysis of the eye-sensing data may be carried out by one or more processors of a HMD, by a server (or other computing device or platform) external to the HMD that receives the eye-sensing data from the HMD via a communicative connection, or both working together in a distributed manner, for example.

Eye-sensing data may include an eye-sensing or gaze signal, corresponding to output of an eye-sensing device, such as a video stream from an eye-sensing video camera. As such, the eye-sensing signal represents an encoded form of the observations of the one or more eyes by the eye-sensing device. For example, the gaze signal could be a digitized encoding of an analog measurement signal. It will be appreciated that other forms of gaze signal are possible as well, including known types of streaming video. The eye-sensing data may include additional information, such as time stamps, calibration scales, parameters, or other ancillary information used in analysis of the eye-sensing data.

In accordance with example embodiments, the observable quantities obtained by the eye-sensing device and output as the eye-sensing signal may be used to determine dynamic characteristics of eye movement, such as ranges of angular motions and speed of angular motion. Acquisition of such eye-movement characteristics from a large sample of different people may provide a basis for determining frequency (or probability) distributions of the dynamic characteristics. In addition, measurements of such physical characteristics as mass of the eye, mass of the eyelid, and size dimensions of various components of the eye, for a large sample of different people may similarly provide a basis for determining frequency (or probability) distributions of the these physical characteristics. Taken together, the various distributions may be used to derive or calculate a model of eye movement including, for example, known or calculated speed and/or amplitude ranges for eye movements, known or calculated forces that can be exerted on the eye by the eyelid. The model may then form bases for evaluation subsequent observations of eye motion.

More particularly, dynamic properties such as eye movement and position present in the eye-sensing signal, and may be determined via temporal analysis of the eye-sensing data. Illustratively, such dynamic properties may include details relating to fixations and saccades. Still further, details relating to fixations and saccades may include, for example, amplitude, direction, duration, velocity, among others. Once a model is developed, it can be used to evaluate the reliability of run-time measurements of eye motion. In particular, a gaze signal that yields motion beyond the limits of what the model specifies as physically realistic may be deemed unreliable.

Generally, an eye-sensing video camera may capture video frames, each containing an image in the form of a two-dimensional pixel array. Each image may thus include a pixel-rendering of an eye. Physical characteristics and movement of the eye may be determined from one or more of such images. For example, movement of the eye may be determined by analyzing how a feature of the eye, such as the pupil, changes position in the image plane across successive video frames. By correlating such geometric parameters as pixel plane size and distance of the video camera from the observed eye, changes in pixel location across video frames may be converted to angular movement (position and rate of change of position) of the eye.

In a related manner, by positioning one or more known, controlled light sources, such as an LED (or LEDs), at a calibrated location (or locations) with respect to one or more eyes under observation, and then by capturing video images of reflections of the light source off the one or more eyes, successive video frames may capture movement of the reflections in the image plane as the one or more eyes move. With the relative geometry of the controlled light source and the one or more eyes known, the observed movement of the reflections in the image plane may be translated into movement of the one or more eyes. Reflections of a known, controlled light source are referred to as controlled glints.

In further accordance with example embodiments, eye-sensing may use both eye-feature observations and controlled glints to determine eye movement and position, possibly as well as other properties and characteristics of one or more eyes.

Figure 3:
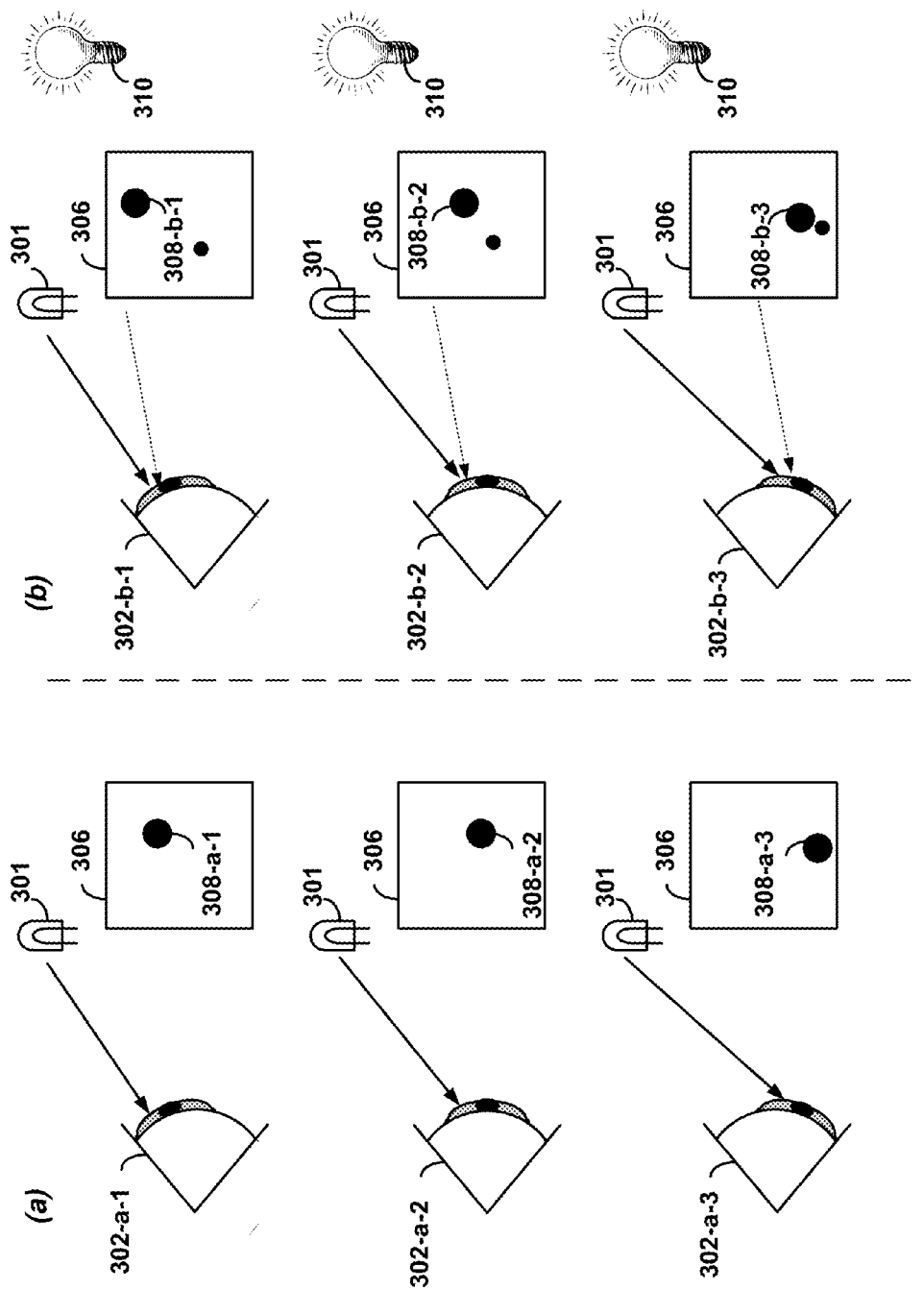
FIG. 3 is a simplified illustration of an eye-position sensing system, according to an illustrative embodiment.

FIG. 3 is a conceptual illustration of eye-sensing using controlled glints, according to example embodiments. The left-hand side of FIG. 3 (labeled "(a)") shows a schematic representation of an eye in three different angular orientations with respect to an LED 301 at a fixed location relative to the eye: eye 302-*a*-1 (top left) is gazing slightly upward; eye 302-*a*-2 (top middle) is gazing horizontally; and eye 302-*a*-3 (bottom left) is gazing slightly downward. For each orientation, the LED 301 (at a fixed location relative to the eye) creates a controlled glint off the eye; the light from the LED 301 is represented respectively as solid arrows from the LED 301 toward the eye. For each orientation of the eye, the glint will be detected at a different location on the eye. Each different location on the eye may be represented conceptually as detection at a different location in a pixel array 306 that could be part of an eye-sensing camera, for example. This is illustrated to the right of the eye; in each image, a black dot represents a controlled glint detected for the corresponding eye orientation: detected glint 308-*a*-1 for the top orientation; detected glint 308-*a*-2 for the middle orientation; and detected glint 308-*a*-3 for the bottom orientation. It will be appreciated that the respective locations of the detected glint in the pixel-array illustrate that different orientations of the eye relative to the LED 301 result in detection by different pixels. However, the particular locations shown are not necessarily intended to represent a precise or true rendering of where in the pixel array 306 the glints would actually be detected, but rather illustrate the concept of correlating eye movement with glint movement in the image plane. Further, in accordance with example embodiments, the locations in the pixel array 306 may be analytically mapped to eye orientations.

In accordance with example embodiments, each pixel array 306 could correspond to a frame of a video signal. The eye-sensing signal could then be considered as encoding pixel positions and values for each frame, including the pixel positions and values associated with the respectively detected glints 308-*a*-1, 308-*a*-2, and 308-*a*-3 of the current illustrative example. Analysis of the eye-sensing signal could then include determining the pixel positions and values associated with the respectively detected glints, and reconstructing the angular orientation of the eye for each image. Frame-by-frame image data could also be used to measure angular velocity of the eye (e.g., saccades). It will be appreciated that this description of data acquisition and analysis is simplified for purposes of the present illustration, and that there may be other steps in practice.

Figure 4:
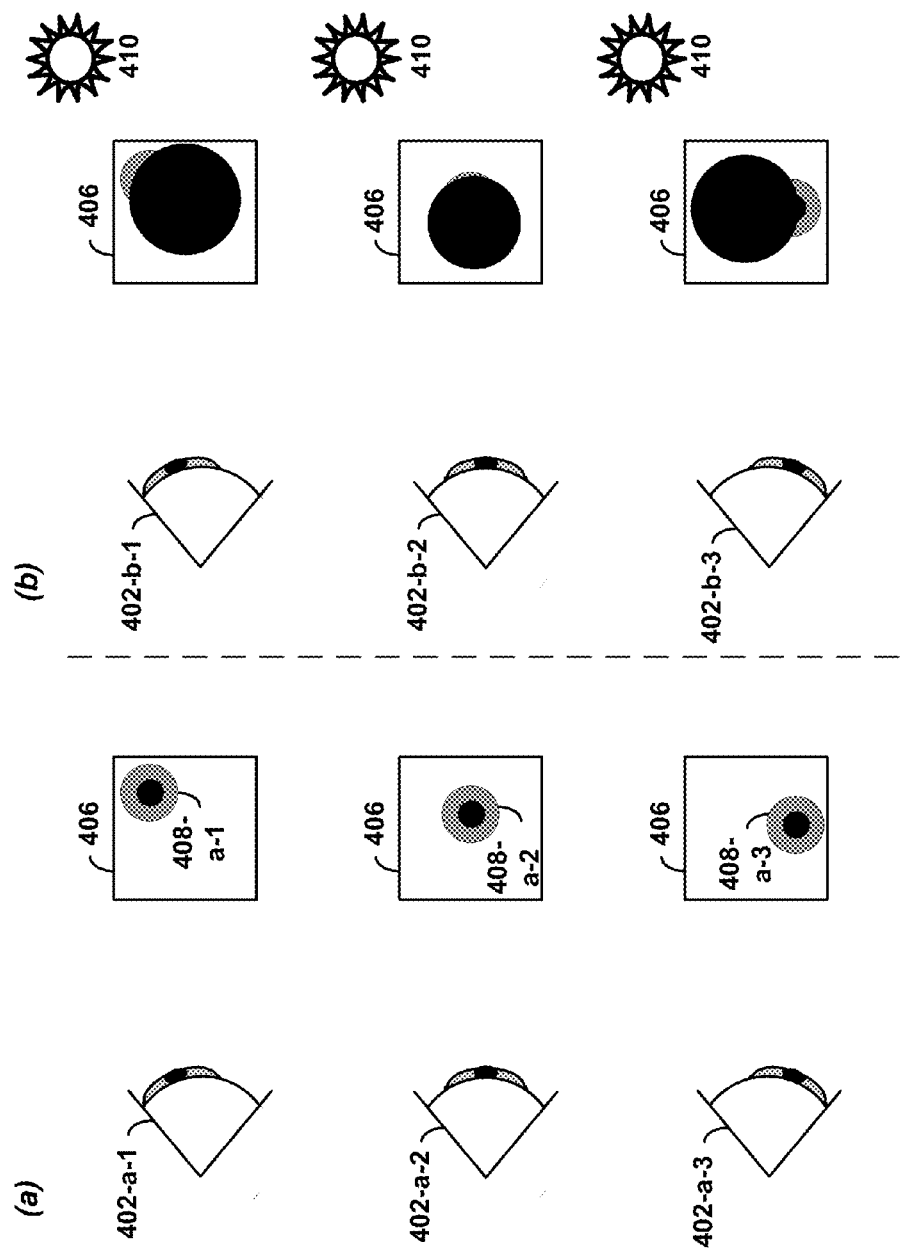
FIG. 4 shows illustrative images of eye glints, according to an example embodiment.

FIG. 4 is a conceptual illustration of eye-sensing using images of the eye, according to example embodiments. The depiction in FIG. 4 is similar to that of FIG. 3, but with figure elements relabeled with numbers referencing 400. The left-hand side of FIG. 4 (labeled "(a)") again shows a schematic representation of an eye in three different angular orientations at a fixed location relative to the LED 301: eye 402-*a*-1 (top left) is gazing slightly upward; eye 402-*a*-2 (top middle) is gazing horizontally; and eye 402-*a*-3 (bottom left) is gazing slightly downward. For this example technique, the eye-sensing signal captures an image of the iris and pupil of the eye. The images of the eye at angular positions 402-*a*-1, 402-*a*-2, and 402-*a*-3 are captured in the image plane 406, and appear at positions 408-*a*-1, 408-*a*-2, and 408-*a*-3, respectively.

In accordance with example embodiments, analysis of the eye-sensing signal includes one or more processes for recognizing the iris and/or pupil in each image, and analytically reconstructing eye position and motion (e.g., saccades) from the change in the position of the iris and/or pupil across successive image frames. In the current example, the three pixel-array images show the movement of the iris/pupil across the image plane.

Information derived from an eye-sensing camera may take the form of an eye-sensing signal, or gaze signal, and may be used as input to one or another process or program. By way of example, the gaze signal could be provided as a stream of digitized data.

In practice, jitters resulting from eye drift, tremors, and/or involuntary micro-saccades may result in a noisy gaze signal. A noisy gaze signal may result in an inaccurate or unreliable measurement of eye movement when such a noisy gaze signal is analyzed for recovery of the observed eye motion.

A smoothing filter and/or a Kalman filter may be applied to a gaze signal to help reduce the noise introduced by such jitters. However, a filter may overly smooth the data during fast eye movements (saccades). To avoid over-smoothing the gaze signal, the filter may be re-initialized when large movements (e.g., saccades) are detected. This initialization may be accomplished as part of an analysis procedure that examines the signal for typical eye movement characteristics.

Disabling a filter due to detecting large eye movements presumes that the detected eye movements are accurate or reliable. However, in some situations, a large eye movement may be detected from an unreliable gaze signal. For example, the eye movement may not be physically reasonable or normal. In such cases, the eye movement should be evaluated to determine if the gaze signal itself may be erroneous or unreliable.

b. Determination of an Erroneous or Unreliable Eye-Sensing Signal

Various causes of an erroneous or unreliable eye-sensing signal may arise in practice. One example is excessive ambient light, which may be illustrated for eye-sensing based on controlled glints. More particularly, a device may detect and/or measure other observable quantities besides known features of the one or more eyes and/or controlled glints from the one or more eyes. Some of the other observable quantities may not necessarily be helpful to the process of eye-sensing. The presence of ambient light may be detected directly by an eye-sensing video camera, or may be detected as spurious reflections off the one or more eyes. As a consequence, the eye-sensing signal may include contributions from ambient light. In the context of analysis of the eye-sensing signal for eye movement and position (possibly as well as other observable characteristics and properties of the one or more eyes), ambient light may manifest as interference, and may introduce a level of uncertainty in the analytical determinations.

It may happen from time to time that a level of interference from ambient light may be sufficiently high so as to cause the eye-sensing data, or the analysis of the eye-sensing data, to be statistically unreliable. When this situation occurs, the use of eye-sensing as input to one or more applications may yield undesirable or erroneous behavior of those one or more applications.

An example of the effect of ambient light interference is illustrated in the right-hand side of FIG. 3 (and labeled "(b)"). In this example, the orientations of the eye, relabeled eye 302-b-1, 302-b-2, and 302-b-3, are the same as those described above for the left-hand side (a) of FIG. 3. Similarly, the illuminating LED 301, and the pixel-array image 306 are also the same as the left-hand side (a) of FIG. 3. However, an ambient light source represented by light bulb 310 is now present, by way of example. Ambient light impinging on the eye are represented as a dashed arrow pointing toward the eye in each orientation.

In this example of ambient-light interference, the reflected glints, relabeled glints 308-b-1, 308-b-2, and 308-b-3, appear at the same positions in the respective pixel-array images. However, there is now a spurious feature (unlabeled) in each image generated by the ambient light from the bulb 310. Such features could mimic controlled glints, and reduce the reliability of an analysis which reconstructs eye movement and position from pixel location and pixel value of glints. The degree to which such spurious features effect the reliability of reconstructing eye-sensing from controlled glints may be depend on if and how they may be distinguished from legitimate controlled glints.

As an example, if spurious features appear as bright as glints in an image, then it may not be possible to distinguish controlled glints from spurious features. In this case, ambient-light interference may result in an erroneous and/or unreliable eye-sensing.

Another example of the effect of ambient light interference illustrated in the right-hand side of FIG. 4 (and labeled "(b)") shows ambient light interference from a strong light source, represented by Sun 410. In this example, the ambient light effectively washes out the images, so that no pupil/iris features can even be identified. As with the example illustrated in FIG. 3, an erroneous and/or unreliable eye-sensing signal may result.

Although not necessarily illustrated in FIGS. 3 and 4, there could be other causes of an erroneous and/or unreliable eye-sensing signal. For example, vibration of a HMD worn by a user—for example while the user is riding a subway—could result in relative movement between an eye-sensing device and the user's eyes that is not due to saccades or other natural eye movement. If such relative movement is excessive, the eye-sensing signal that captures the movement could become unreliable. Other sources or causes of erroneous and/or unreliable eye-sensing signals are possible as well.

In accordance with example embodiments, an eye-sensing or gaze signal may be analytically evaluated by comparing the eye movement derived from the signal with a model of eye movement based on physical characteristics of the eye, as described generally above, for example. In particular, the physical characteristics of the eye may be used to set values of parameters of eye movement. The parameters may set ranges or thresholds on measured variables derived from the actual eye-sensing signal, thereby defining rules of eye movement. Illustratively, the rules of eye movement may include, for example, (a) minimum and maximum eye movements during fixations (e.g., a variation between 1 and 4 degrees in angle), (b) minimum and maximum eye movements during saccades (e.g., between 1 and 40 degrees in angle, with 15-20 degrees being typical), (c) minimum and maximum durations of a saccade movement (e.g. durations between about 30 ms and 120 ms), (d) a maximum frequency of occurrence of eye movements between fixations (e.g., the eye not moving more than ten times per second), (e) a minimum time duration or refractory period between consecutive saccade movements (e.g., about 100-200 ms separating two consecutive saccade movements), (f) a maximum duration for fixations (e.g., fixations lasting less than about 600 ms), (g) relationships between amplitude, duration, and/or velocity of saccades (e.g., a generally linear relationship between amplitude and duration or between amplitude and velocity), and/or other inconsistent eye movement results, such as translations of the eyeball out of the head or rotations too far into the head. Other rules and associated eye movement parameters may be defined as well.

The measured variables may be compared against the model parameters to determine whether the eye-sensing signal corresponds to eye movement that violates the rules. If the eye-sensing signal violates the rules, the derived eye movement may be deemed to be non-physical eye movement, in which case the eye-sensing signal may be considered erroneous or unreliable. In response to determining that an eye-sensing signal is, or has become, erroneous or unreliable, a system using the signal (e.g., a HMD) may take one or more corrective and/or evasive actions in connection with processes, programs, or applications that use the gaze signal as input, for example.

c. Adapted Operation of Eye-Sensing

In accordance with example embodiments, the HMD may be caused to suspend or terminate one or more applications that are impacted by the erroneous or unreliable eye-sensing signal, or to suggest or advise that the one or more applications that are impacted by the erroneous or unreliable eye-sensing signal be suspended or terminated. Further, notifications, alerts, suggestions, and/or advisements presented or issued by the HMD may be considered as being directed to a user of the HMD, although other types of recipients are possible as well.

More particularly, when an eye-sensing signal is deemed erroneous or unreliable, one or more corrective, compensating, preventive, or preemptive actions may be taken. Possible actions include, for example, turning off a Kalman filter (or other filter), re-calibrating the eye-sensing system, and/or alerting or notifying a user of the unreliable eye-sensing signal, among others. The alert or notification may take the form of a text message, visual cue, audible cue, or some other presentation at the HMD.

The alert or notification may further indicate which, if any, applications are impacted by the erroneous or unreliable eye-sensing signal. Such notification can also identify one or more applications that use eye-sensing as input. The identification can be used to issue a further notification that the one or more applications may behave erroneously, or that use of the one or more applications should be suspended or terminated. Alternatively or additionally, operation of the one or more applications could be suspended upon determination of an erroneous eye-sensing signal, or a suggestion can be made that the one or more applications that are impacted by the erroneous or unreliable eye-sensing signal be suspended or terminated.

Further, notifications, alerts, suggestions, and/or advisements presented or issued by the HMD may be considered as being directed to a user of the HMD, although other types of recipients are possible as well.

In further accordance with the example embodiment, the notification could include an indication of one or more corrective actions that could be taken to reduce or eliminate the excessive level of ambient-light interference. For example, the indication could be to reorient the HMD away from a source of interfering light. Alternatively or additionally, the indication could be to shade the HMD or the eye-sensing device of the HMD from the interfering light.

In accordance with example embodiments, upon a determination that a noise level of an erroneous eye-sensing signal has dropped below a threshold level, use of eye-sensing as input to the one or more applications may be resumed. A notification of resumption may also be issued. If suspension of use of input was automatic (e.g., without active user interaction), resumption may also be automatic.

V. EXAMPLE METHODS AND SYSTEMS

Figure 5:
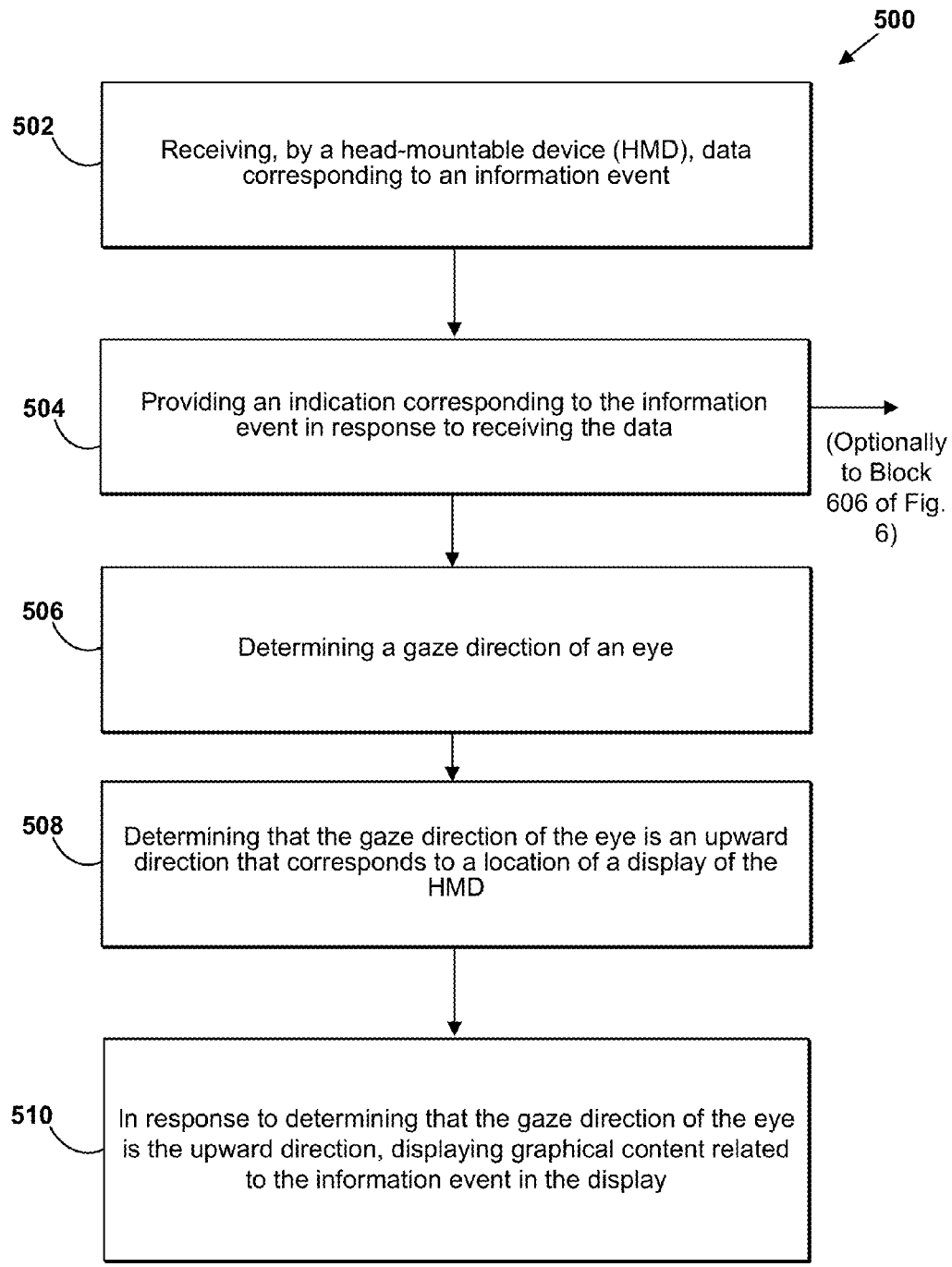
FIG. 5 is a block diagram of an example method.

FIG. 5 is a block diagram depicting an example method 500, in accordance with at least some embodiments described herein.

At block 502, the method 500 includes receiving, by a head-mountable device (HMD), data corresponding to an information event. A display of the HMD may be located in an upper periphery of a forward-looking field of view of an eye of a wearer when the HMD is worn by the wearer. For example, the HMD 172 of FIG. 1E may receive the data corresponding to the information event from the remote device 230 (e.g., a server) using the communication link 220 of FIG. 2. The data may be related to a message (e.g., email, SMS, or MMS) received by the HMD. In some examples, the HMD 172 may also be configured to receive "push notifications" perhaps associated with an application (e.g., a social media application) running on the HMD 172. In this example, the HMD 172 may provide a standing command to a server to provide push notifications and the HMD 172 may be configured to receive such push notifications as they are provided.

Alternatively, data may be received by the processor 214 of FIG. 2 from a sensor of the HMD 172, such as a battery meter that monitors an amount of energy remaining in a battery of the HMD. Here, the data may include information indicating that the amount of stored energy remaining in the battery is low. In another example, the HMD may cause a camera of the HMD to capture an image of a wearer's ambient environment (e.g., a landmark). The HMD may then send the image to a server. The server may have access to information regarding the landmark and may send the information regarding the landmark to the HMD (to be presented to a wearer). Other examples of information events are possible.

Figure 9A:
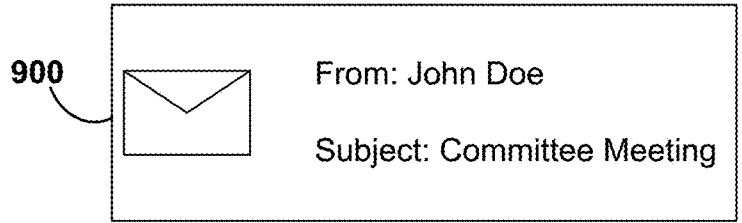
FIG. 9A illustrates a visual indication related to an information event.

At block 504, the method 500 includes providing an indication corresponding to the information event in response to receiving the data. The indication (e.g., provided by the HMD) could be an audio indication, a visual indication, or a vibration indication. For example, the audio indication may include a chime, beep, or ringtone provided by a speaker or a bone conduction transducer of the HMD. A vibration indication may include a vibration provided by the speaker, the bone conduction transducer, or any other component of the HMD configured to produce a vibration pulse noticeable to a wearer of the HMD. As another example, a visual indication 900 related to an incoming email message is illustrated in FIG. 9A. The visual indication 900 may include information such as a sender and a subject of an email message (other examples are possible). However, more detailed information such as the body of the email message may be omitted from the visual indication 900. A visual indication may also include a blinking or otherwise illuminated LED, or a conspicuous or bright image within a display of the HMD that is perceptible within the wearer's field of view when the wearer's eye is oriented in a gaze direction that is (or is not) aligned with the display of the HMD.

Figure 7A:
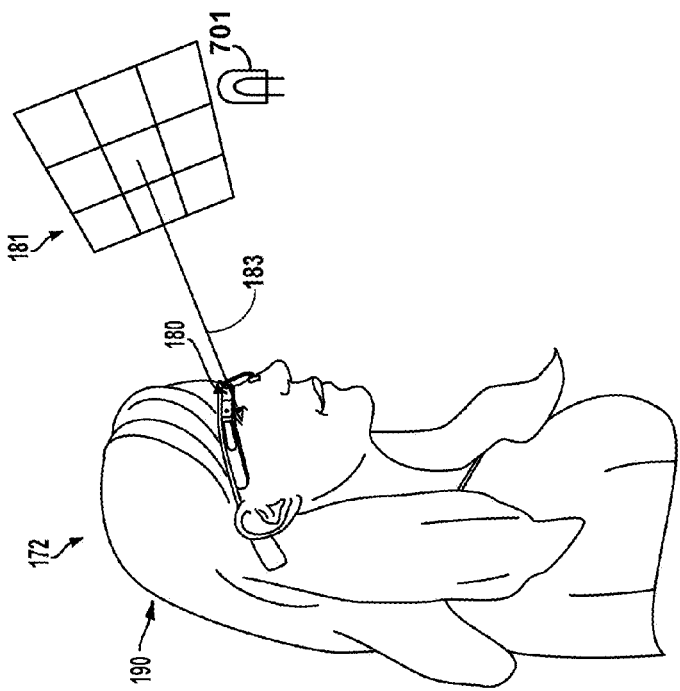
FIG. 7A illustrates an example gaze direction of an eye of a wearer that is not aligned with a display of a head-mounted device.

Referring to FIG. 7A as an example, the wearer 190 may have her eye(s) aligned substantially in front of her (e.g., in a gaze direction or line of sight 183 that is substantially parallel to the ground) such that images 181 displayed by the display 180 of the HMD 172 may only be perceptible within her peripheral field of view. Depending on how the HMD 172 is implemented, a visual indication provided by the HMD 172 may be visible within the wearer's peripheral field of view (e.g., as part of the images 181 displayed by the display 180) or may be visible near her direct line of sight 183, perhaps as an illuminated LED 701.

Figure 7B:
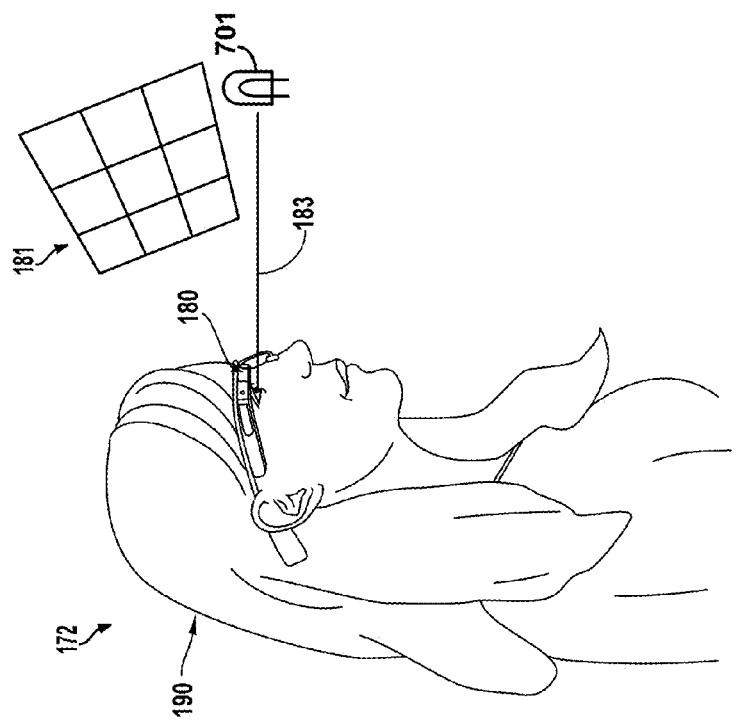
FIG. 7B illustrates an example gaze direction of an eye of a wearer that is aligned with a display of a head-mounted device.

Referring to FIG. 7B as an example, the wearer 190 may have moved have her eye(s) to align at an upward angle (e.g., with respect to a plane parallel with the ground) such that images 181 are perceptible along her new line of sight 183. Depending on how the HMD 172 is implemented, a visual indication provided by the HMD 172 may be visible within the wearer's peripheral field of view (e.g., an illuminated LED 701 visible below the images 181 displayed by the display 180) or may be visible near her direct line of sight 183, perhaps as part of the images 181 displayed by the display 180.

In another example, the HMD may be communicatively coupled to another computing device, such as a network-enabled or Bluetooth® compatible headset, wristwatch, tablet computer, laptop computer or smartphone. The method 500 may include the HMD causing the computing device communicatively coupled to the HMD to provide the indication, which may include any kind of indication contemplated above.

At block 506, the method 500 includes determining a gaze direction of an eye. The gaze direction of the eye may be determined using any of the systems or methods depicted in FIGS. 3 and 4 or described in sections III and IV above. Referring to FIG. 8C as an example, light sources 854A and 854B may illuminate an eye area 800. The light sensor 852 may detect reflected light that respectively corresponds to the light provided by the light sources 854A and 854B. The gaze detection system 850 or the HMD may determine the gaze direction of the eye in various ways based on the light detected by the light sensor 852.

In some examples, instead of determining a gaze direction of an eye, the HMD may detect or sense various eye gestures performed by the wearer. For instance, the HMD may detect a wink or a blink of the wearer's eye. In this case, the HMD may display graphical content related to the information event in the display in response to detecting or sensing the wink or blink gesture. Other examples of eye gestures are possible.

At block 508, the method 500 includes determining that the gaze direction of the eye is an upward direction that corresponds to a location of a display of HMD. The display is located in an upper periphery of a forward-looking field of view of the eye when the HMD is worn. The HMD 172 may determine that the current gaze direction of the eye is the upward direction by comparing light sensor data or proximity sensor data associated with the current gaze direction to stored data associated with a known upward gaze direction. Generally, the gaze direction of the eye may be determined using any of the systems or methods depicted in FIGS. 3 and 4 or described in sections III and IV above.

FIG. 7B depicts a gaze direction of an eye of a wearer 190 that is aligned with a display 180 of an HMD 172, the display 180 being located in an upper periphery of a forward-looking field of view of the eye. As shown in FIG. 7B, display 180 may display images 181 that have an apparent location that is substantially aligned with the wearer's line of sight 183 as the wearer is looking upward. However in FIG. 7A, the display 180 displays images 181 that, to the wearer 190, are apparently located in an upper periphery of a forward-looking field of view of the eye of the wearer 190 (e.g., as the wearer is looking forward as indicated by line of sight 183).

In some instances, the HMD may determine that the determined gaze direction of the eye has persisted for at least a threshold duration (e.g., 2 seconds) in order to (i) increase accuracy of the gaze direction determination or (ii) to increase a confidence level that a wearer of the HMD is interested in the provided indication before using the display of the HMD to provide more detailed information related to the indication. As used herein, gaze directions that are "aligned with the display of the HMD" may include a range of solid angles that include a gaze direction that is centered upon the display. A gaze direction that is not "aligned with the display of the HMD" may be outside the range of solid angles.

Figure 9B:
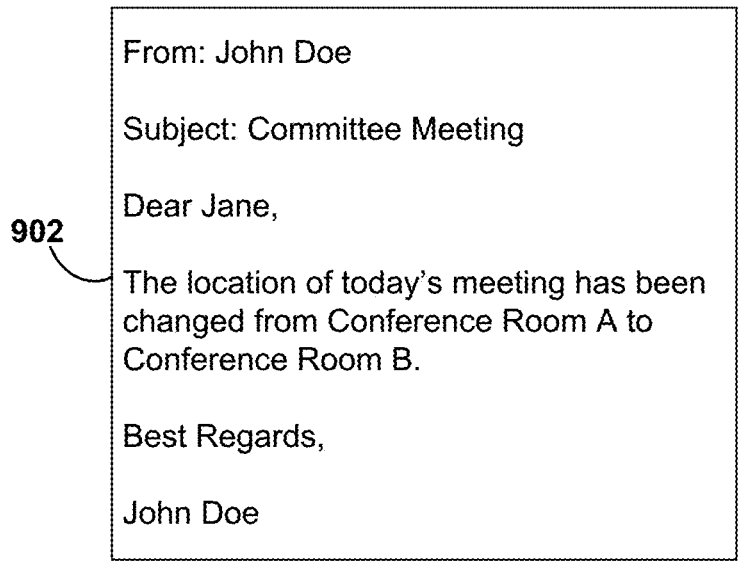
FIG. 9B illustrates displayed information related to an information event.

At block 510, the method 500 includes, in response to determining that the gaze direction of the eye is the upward direction, displaying graphical content related to the information event in the display. As illustrated in FIG. 9B, if the received data represents an email message, the displayed graphical content 902 may include text representing contents of the body of the email message. If the received data represents information regarding a wearer's surroundings (e.g., a landmark), the graphical content may include imagery or text related to or describing the landmark. If the received data represents a message from a battery meter of the HMD indicating that the battery of the HMD is running low on stored energy, the graphical content may include text or imagery indicating that the battery is running low on stored energy.

After determining the gaze direction of the eye, the method 500 may further include, (i) determining that a threshold duration did not elapse between respective times at which the gaze direction was determined and at which the indication was provided, and (ii) displaying the graphical content at least in part based on determining that the threshold duration did not elapse between the respective times. For example, the indication may be provided in accordance with block 504, and the wearer of the HMD may direct her gaze toward the display of the HMD within 5 seconds of the indication being provided. If the threshold duration is 10 seconds, the HMD may determine that the threshold duration has not elapsed since the indication was provided and then display the graphical content related to the indication upon detecting the determining that the gaze is aligned with the display. However, if 12 seconds pass after the indication is provided and before the wearer directs her gaze toward the display, the graphical content may not be displayed (at least not without the wearer providing other inputs indicating a desire to view the graphical content).

In another example, the method 500 may include (i) determining that a predetermined duration has passed since the indication was provided and (ii) prior to displaying the graphical content, ceasing to provide the indication based on determining that the predetermined duration has passed since the indication was provided. In such an example, the indication may subside after passing of the predetermined duration, but there may exist another time window after ceasing to provide the indication during which the wearer may look up at the display to cause display of the graphical content. For example, the HMD may cease to provide the indication after 5 seconds pass since the indication was initially provided. A user may then direct her gaze toward the display 2 seconds after the HMD ceased to provide the notification. In this case, if the predetermined duration is 8 seconds, the HMD may display the graphical content, but if the predetermined duration is 11 seconds, the graphical content may not be provided absent further inputs provided by the wearer.

After determining the (first) gaze direction, the method 500 may further include determining a second gaze direction of the eye that is not aligned with the display of the HMD, and in response to determining the second gaze direction, causing the display to not include the graphical content (e.g., removing the graphical content from the display). For example, after the indication is provided the wearer may align her gaze toward the display of the HMD to view the displayed graphical content. At some point, the wearer may finish reading or viewing the displayed graphical content and direct her gaze away from the display of the HMD. Upon determining the second gaze direction that is not aligned with the display, the HMD may remove the graphical content from the display and could also disable the display to save energy and so that the wearer may be able to see through the entirety of the display.

In some examples, accuracy of gaze detection may be enhanced by a calibration procedure. To this end, the method 500 may include the HMD providing a message to a wearer requesting a gaze direction of the wearer's eye that is aligned with the display of the HMD. While the wearer has aligned her gaze toward the display, the HMD (e.g., light source 138) may illuminate an eye area corresponding to the eye with incident light. The eye area may include any area of the wearer's face or head in the vicinity of the eye. The HMD (e.g., light sensor 140) may then detect an intensity of light reflected from the eye area while the eye is aligned in the gaze direction that is aligned with the display, and store data representing the detected intensity of the reflected light. The stored data may represent a sample for future comparison in determining gaze directions. For example, determining the gaze direction of the eye may include detecting an intensity of light that is within a predetermined intensity range that includes the detected intensity that corresponds to the known conditions where the wearer aligned her gaze toward the display of the HMD.

Figure 6:
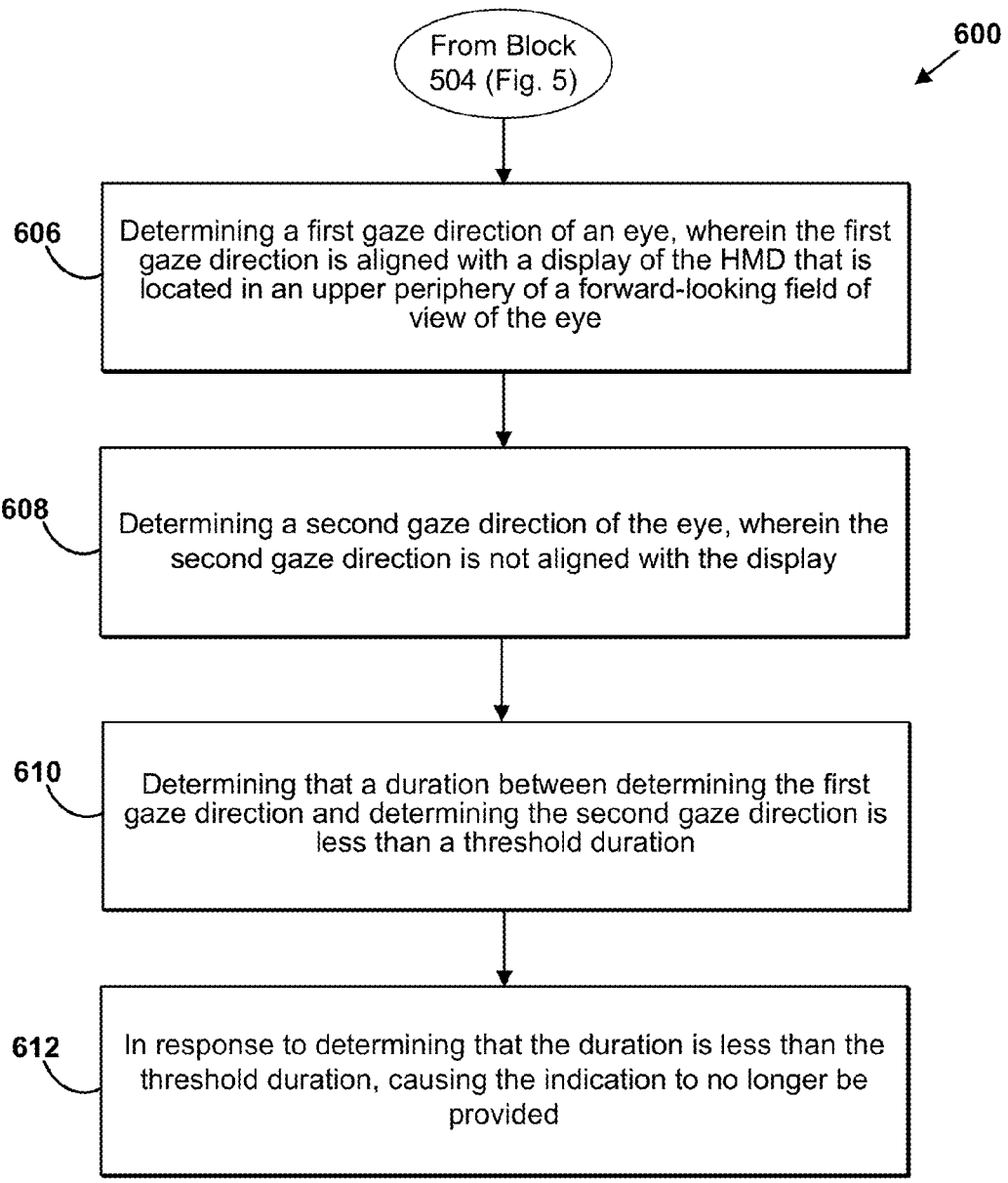
FIG. 6 is a block diagram of an example method.

FIG. 6 is a block diagram depicting an example method 600, in accordance with at least some embodiments described herein.

In some examples, block 606 of method 600 may be preceded by blocks 502 and 504 of the method 500, described above and depicted in FIG. 5. At block 606, the method 600 includes determining a first gaze direction of an eye, wherein the first gaze direction is aligned with a display of the HMD that is located in an upper periphery of a forward-looking field of view of the eye (e.g., FIG. 7B). The gaze direction of the eye may be determined using any of the systems or methods depicted in FIGS. 3 and 4 and described in accompanying text above, or in any text above related to blocks 506 or 508 of method 500.

At block 608, the method 600 includes determining a second gaze direction of the eye, wherein the second gaze direction is not aligned with the display. For example, FIG. 7A depicts a second gaze direction (e.g., line of sight 183) that is not aligned with the display 180, meaning that the images 181 displayed by the display 180 are visible within a peripheral field of view of the wearer 190 (if at all visible to the wearer).

At block 610, the method 600 includes determining that a duration between determination of the first gaze direction and determination of the second gaze direction is less than a threshold duration. In order to determine the duration between the determinations, the HMD 172 may maintain an internal clock or may receive network clock signals from a remote device 230 of FIG. 2. For example, the indication may be provided in accordance with block 504, and the wearer of the HMD may direct her gaze toward the display (e.g., the first gaze direction). Then the wearer may redirect her gaze away from the display within 1 second of directing her gaze toward the display. If the threshold duration is 2 seconds, the HMD may determine that less than the threshold duration has passed between respective determinations of the first and second gaze directions.

At block 612, the method 600 includes, in response to the determination, causing the indication to no longer be provided. In the case of a vibration indication, the HMD may cause the HMD to cease vibrating. In the case of an audio indication, a speaker of the HMD may discontinue a constant or periodic chime or beeping that constitutes the audio indication. In the case of a visual indication, the HMD may cause an LED of the HMD to cease illuminating or to cease blinking, or may cause the display of HMD to cease providing a conspicuous visual indication.

Figure 10:
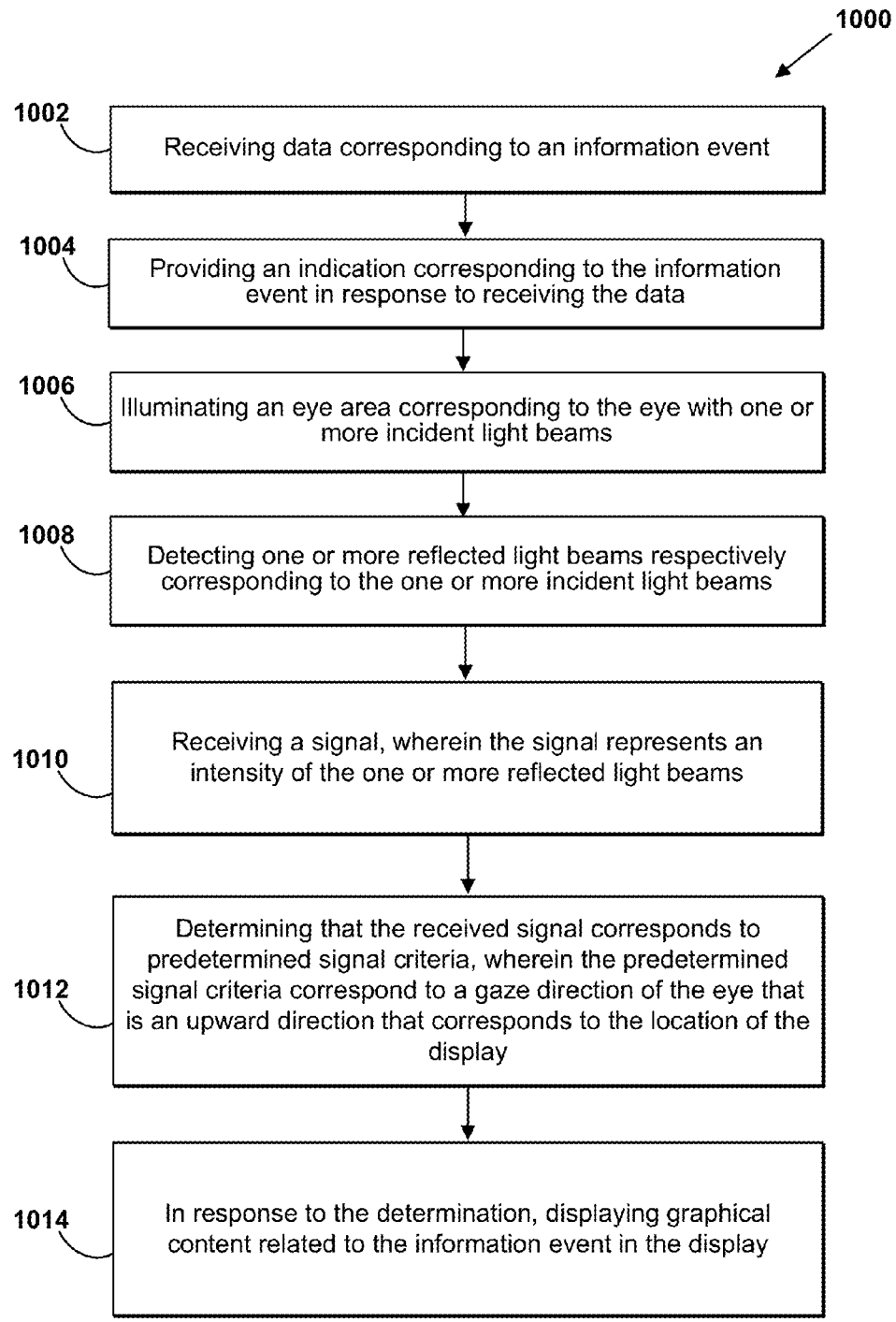
FIG. 10 is a block diagram of an example method.

FIG. 10 is a block diagram depicting an example method 1000, in accordance with at least some embodiments described herein.

At block 1002, the method 1000 includes receiving, by a head-mountable device (HMD), data corresponding to an information event, wherein a display of the HMD is located in an upper periphery of a forward-looking field of view of an eye of a wearer when the HMD is worn by the wearer. Block 1002 may include any functionality described above in relation to block 502 of method 500.

At block 1004, the method 1000 includes providing, by the HMD, an indication corresponding to the information event in response to receiving the data. Block 1004 may include any functionality described above with respect to block 504 of method 500.

At block 1006, the method 1000 includes illuminating, by an eye-detection system of the HMD, an eye area corresponding to the eye with one or more incident light beams. The eye-detection system may include any eye-detection system or eye-sensing system described above in Sections III and IV. For example, one or more light source 138 of gaze detection system 136 may illuminate the eye area with one or more incident light beams.

At block 1008, the method 1000 includes detecting, by the eye-detection system, an intensity of one or more reflected light beams corresponding to the one or more incident light beams. For example, light sensor 140 may detect reflected light beams corresponding to incident light beams generated by the one or more light source 138.

At block 1010, the method 1000 includes receiving, by the HMD, a signal from the eye-detection system, wherein the signal represents the intensity of the one or more reflected light beams. For example, the light sensor 140 may generate the signal and send the signal to be received by a processor of the HMD.

Figure 11:
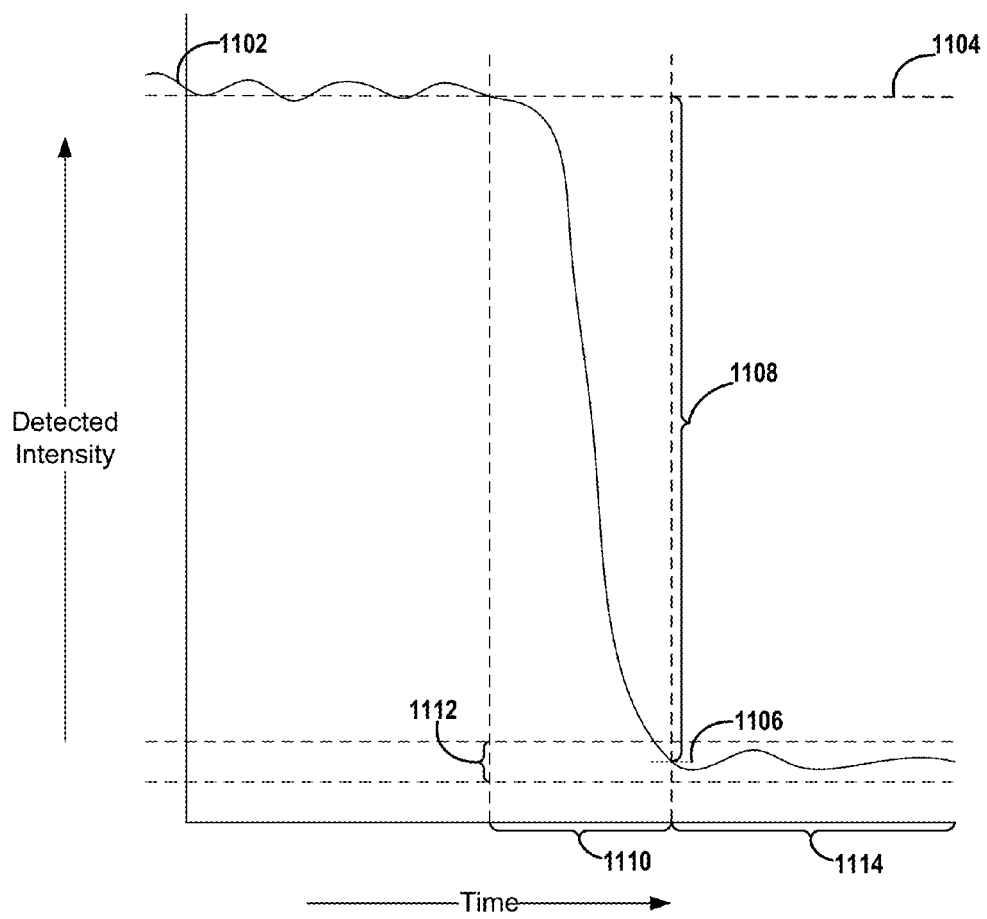
FIG. 11 illustrates an example detected intensity signal with respect to time.

At block 1012, the method 1000 includes determining, by the HMD, that the received signal corresponds to predetermined signal criteria, wherein the predetermined signal criteria correspond to a gaze direction of the eye that is an upward direction that corresponds to the location of the display. For example, the HMD may store, for comparison to data received under operating conditions, reference data representing signal characteristics that correspond to a condition where the wearer has directed his or her gaze upward toward the display of the HMD. Referring to FIG. 11 as an example, the signal 1102 may represent a detected intensity of the one or more reflected light beams as a function of time. For instance, the signal 1102 may be a voltage or current that is proportional or inversely proportional to the detected intensity of the one or more reflected light beams.

One signal criterion that may correspond to the wearer's upward gaze (toward the display) may be that the signal 1102 indicates a negative change, from a first intensity 1104 to a second intensity 1106 that is less than the first intensity 1104. The magnitude of intensity difference between the first intensity 1104 and the second intensity 1106 may be referred to as a threshold magnitude 1108. In this way, determining that the received signal corresponds to the predetermined signal criteria may include determining that the received signal indicates that a magnitude of the negative intensity change of the reflected light beam(s) exceeds the threshold magnitude 1108.

Another criterion that may correspond to an upward gaze of the wearer (toward the display) is that the negative change in intensity represented by the signal 1102 (from the first intensity 1104 to the second intensity 1106) may have occurred during a duration that is less than a threshold duration 1110. This may be indicative of a sharp change in the gaze direction of the wearer's eye toward the display. In this way, determining that the received signal corresponds to the predetermined signal criteria may include determining that the received signal indicates a negative change in detected intensity of the one or more reflected light beams, from the first intensity 1104 to the second intensity 1106, and that the change occurred during a duration that is less than the threshold duration 1110.

Yet another criterion that may correspond to an upward gaze of the wearer (toward the display) is that during a predetermined duration 1114 that follows the negative change in detected intensity, the magnitude of the detected intensity of the one or more reflected light beams represented by signal 1102 might not change more than a predetermined amount. For example, after exhibiting the negative change in intensity from the first intensity 1104 to the second intensity 1106, the signal 1102 may stay within a range 1112 representing a range of intensities of the one or more reflected light beams that includes the second intensity 1106. That is, if the signal "settles" near a level representing the second intensity 1106 for given amount of time after the apparent negative change in intensity, it becomes more likely that the signal 1102 actually indicates the wearer moving his or her gaze upward toward the display. In this way, determining that the received signal corresponds to the predetermined signal criteria may include determining that the signal 1102 indicates that during a predetermined duration that follows the negative change in detected intensity, a magnitude of the detected intensity has not changed more than a predetermined amount. In short, the HMD may compare the detected signal to any of the predetermined signal criteria listed above in order to indirectly determine that the wearer has moved their gaze upward toward the display.

At block 1014, the method 1000 includes in response to the determination, displaying, by the HMD, graphical content related to the information event in the display. Block 1014 may include any functionality described above in relation to block 510.

VI. CONCLUSION

An individual user or a group of users may create a data-based "user-account," which may also be referred to simply as an "account." A user-account for a particular user or user group may include data related to the particular user or user group, which the user or user group has opted to provide for the user-account. As such, a particular user's account may, in a sense, be a data-based representation of that particular user. A user may create an account for various applications, web sites, and/or online services, for instance. Examples of user accounts include e-mail accounts, social network accounts, online financial accounts, accounts with service providers, among other possibilities. Further, in some cases, a user may have a single user-account that provides as a data-based representation of the user for multiple services, websites, applications, etc. For instance, a user could opt to use their e-mail account or social network account as a common login for various online services and applications, which are provided by a number of different entities. Further, a user of a computing device, such as a mobile phone, laptop computer, or wearable computing device, may associate their user-account with the computing device itself, such that while the user is operating the computing device, their account will be associated with applications that are provided on the computing device.

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A method comprising:
   receiving, by a head-mountable device (HMD), data corresponding to an information event, wherein a display of the HMD is located in an upper periphery of a forward-looking field of view of an eye when the HMD is worn;
   providing an indication of the information event in response to receiving the data;
   detecting, within a threshold period of time from the providing of the indication, an upward gaze direction of the eye that is toward the display; and
   in response to detecting the upward gaze direction toward the display within the threshold period of time, displaying content related to the information event in the display.

2. The method of claim 1, wherein the indication includes an audio indication provided by the HMD.

3. The method of claim 1, wherein the indication includes a vibration indication provided by the HMD.

4. The method of claim 1, wherein the indication includes an illuminated LED of the HMD.

5. The method of claim 1, wherein providing the indication comprises causing a computing device communicatively coupled to the HMD to provide the indication.

6. The method of claim 1, further comprising:
   after displaying the content in the display, providing a second indication of a second information event;
   determining that a predetermined duration has elapsed since the second indication was provided; and
   ceasing to provide the second indication based on determining that the predetermined duration has elapsed since the second indication was provided.

7. The method of claim 1, wherein the detected gaze direction is a first gaze direction, the method further comprising:
   after displaying the content in the display, detecting a second gaze direction of the eye that is not toward the display of the HMD; and
   in response to detecting the second gaze direction, ceasing to display the content.

8. The method of claim 1, wherein detecting the upward gaze direction of the eye that is toward the display comprises determining that the gaze direction has been toward the display for at least a threshold duration.

9. The method of claim 1, further comprising:
   providing a message requesting a calibration gaze direction of the eye that is toward the display;
   while the eye is aligned with the calibration gaze direction, illuminating an eye area corresponding to the eye with incident light;
   determining an intensity of light reflected from the eye area while the eye is aligned with the calibration gaze direction; and
   storing data representing the determined intensity of the reflected light.

10. The method of claim 9, wherein detecting the upward gaze direction of the eye comprises determining that the determined intensity is within a predetermined intensity range.

11. A method comprising:
    receiving, by a head-mountable device (HMD), data corresponding to an information event, wherein a display of the HMD is located in an upper periphery of a forward-looking field of view of an eye when the HMD is worn;
    providing an indication of the information event in response to receiving the data;
    detecting a first gaze direction of the eye that is toward the display;
    after a duration of time, detecting a second gaze direction of the eye that is not toward the display;
    determining that the duration is less than a threshold duration; and
    in response to determining that the duration is less than the threshold duration, ceasing to provide the indication.

12. A head-mountable device (HMD) comprising:
    a processor;
    a display arranged on the HMD such that when the HMD is worn, the display is located in an upper periphery of a forward-looking field of view of an eye; and
    a computer-readable medium storing instructions that, when executed by the processor, cause the HMD to perform functions comprising:
    receiving data corresponding to an information event;
    providing an indication of the information event in response to receiving the data;
    detecting, within a threshold period of time from the providing of the indication, an upward gaze direction of the eye that is toward the display; and
    in response to detecting the upward gaze direction toward the display within the threshold period of time, displaying content related to the information event in the display.

13. The HMD of claim 12, wherein the indication includes an audio indication provided by the HMD.

14. The HMD of claim 12, wherein the indication includes a vibration indication provided by the HMD.

15. The HMD of claim 12, wherein the indication includes an illuminated LED of the HMD.

16. The HMD of claim 12, wherein the detected gaze direction is a first gaze direction, the functions further comprising:
    after displaying the content in the display, detecting a second gaze direction of the eye that is not toward the display; and
    in response to detecting the second gaze direction, ceasing to display the content.

17. The HMD of claim 12, wherein detecting the upward gaze direction of the eye comprises determining that the gaze direction has been toward the display for at least a threshold duration.

18. The HMD of claim 12, wherein the functions further comprise:
    providing a message requesting a calibration gaze direction of the eye that is toward the display;
    while the eye is aligned with the calibration gaze direction, illuminating an eye area corresponding to the eye with incident light;
    determining an intensity of light reflected from the eye area while the eye is aligned with the calibration gaze direction; and
    storing data representing the determined intensity of the reflected light.

19. The HMD of claim 18, wherein determining that the gaze direction of the eye is an upward direction that is toward the display comprises determining that the determined intensity is within a predetermined intensity range.

20. The HMD of claim 12, wherein providing the indication comprises causing a computing device communicatively coupled to the HMD to provide the indication.

21. A method comprising:
receiving, by a head-mountable device (HMD), data corresponding to an information event, wherein a display of the HMD is located in an upper periphery of a forward-looking field of view of an eye when the HMD is worn;
providing, by the HMD, an indication of the information event in response to receiving the data;
illuminating, by an eye-detection system of the HMD, an eye area corresponding to the eye with one or more incident light beams;
detecting, by the eye-detection system, an intensity of one or more reflected light beams corresponding to the one or more incident light beams;
receiving, by a processor of the HMD, a signal from the eye-detection system, wherein the signal represents the intensity;
determining, by the HMD, that the received signal meets predetermined signal criteria, wherein the predetermined signal criteria correspond to a gaze direction of the eye that is an upward direction that is toward the display; and
in response to the determination, displaying, by the HMD, content related to the information event in the display,
wherein determining that the received signal meets the predetermined signal criteria comprises determining that the signal indicates (i) a negative change in the detected intensity, (ii) that a magnitude of the change in the detected intensity exceeds a threshold magnitude, and (iii) that the negative change in detected intensity occurred during a duration that is less than a threshold duration.

22. The method of claim 21, wherein determining that the received signal meets the predetermined signal criteria further comprises determining that the signal indicates that, during a predetermined duration that follows the negative change in detected intensity, a magnitude of the detected intensity did not change more than a predetermined amount.

* * * * *